US012574088B2

(12) United States Patent
Ibrahim et al.

(10) Patent No.: US 12,574,088 B2
(45) Date of Patent: Mar. 10, 2026

(54) CHANNEL REPORTING FOR NON-FULL-DUPLEX AND FULL-DUPLEX MODES

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 479 days.

(21) Appl. No.: 18/318,630

(22) Filed: May 16, 2023

(65) Prior Publication Data

US 2024/0388342 A1     Nov. 21, 2024

(51) Int. Cl.
| | |
|---|---|
| *H04L 1/00* | (2006.01) |
| *G01R 31/08* | (2020.01) |
| *G06F 11/00* | (2006.01) |
| *G08C 15/00* | (2006.01) |
| *H04B 7/06* | (2006.01) |
| *H04B 7/08* | (2006.01) |
| *H04J 1/16* | (2006.01) |
| *H04J 3/14* | (2006.01) |

(52) U.S. Cl.
CPC ......... *H04B 7/0626* (2013.01); *H04B 7/0802* (2013.01)

(58) Field of Classification Search
CPC ............................ H04B 7/0626; H04B 7/0802
See application file for complete search history.

(56) References Cited

U.S. PATENT DOCUMENTS

| | | | | |
|---|---|---|---|---|
| 2018/0254812 | A1* | 9/2018 | Park | H04L 5/005 |
| 2023/0130732 | A1* | 4/2023 | Ibrahim | H04W 72/0446 370/329 |
| 2023/0135716 | A1* | 5/2023 | Ibrahim | H04L 5/14 370/329 |
| 2023/0239805 | A1* | 7/2023 | Kang | H04W 52/52 370/277 |
| 2023/0319864 | A1* | 10/2023 | Ibrahim | H04W 72/542 370/329 |
| 2024/0381134 | A1* | 11/2024 | Ibrahim | H04L 5/0048 |

* cited by examiner

*Primary Examiner* — Edan Orgad
*Assistant Examiner* — Hidayat Dabiri
(74) *Attorney, Agent, or Firm* — QUALCOMM Incorporated

(57) ABSTRACT

Methods, systems, and devices for wireless communications are described. A UE may receive a set of reference signals from a network entity in accordance with a resource configuration. The set of reference signals may be received via non-full-duplex communication resources. Based on measuring the set of reference signals, the UE may transmit one or more channel state information (CSI) reports to the network entity in accordance with a first set of antenna ports and a second set of antenna ports. The first set of antenna ports may be selected by the UE based at least in part on the resource configuration, and the second set of antenna ports may be active antenna ports in full-duplex communication resources. The one or more CSI reports may include information associated with the first set of antenna ports.

30 Claims, 19 Drawing Sheets

Half Duplex Slot 215

Full Duplex Slot 220-a

Full Duplex Slot 220-b

Downlink resource 225          Uplink resource 230

Uplink 205

240

235

Downlink 210

245

105-a 115-a

Report Generation

260

Report 245-a → Resource Configuration 255-a

Report 245-b → Resource Configuration 255-b

Report 245-c

Receiver

Communications Manager

Transmitter

610

620

615

605

600

130

105

115

Network Entity

Transceiver

1310

Antenna

1315

Communications Manager

1320

Memory

Code

1330

1325

1340

Processor

1335

1305

1300

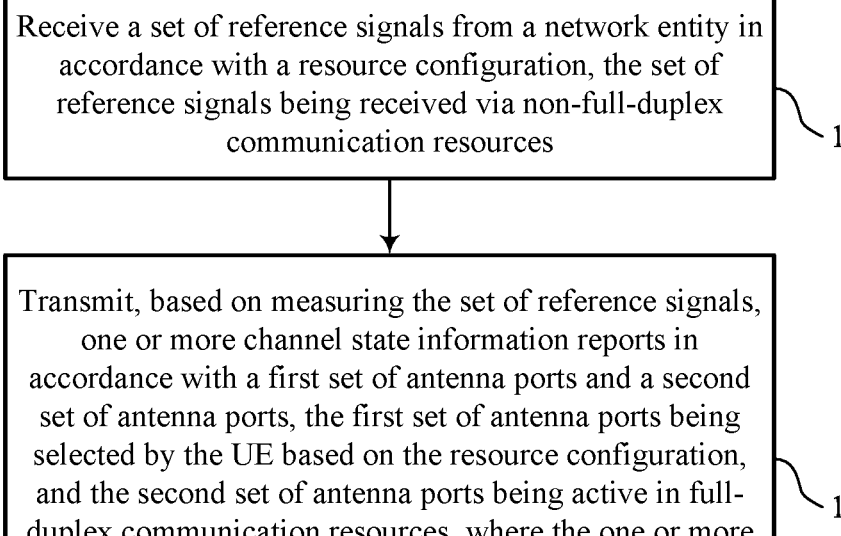

Receive a set of reference signals from a network entity in accordance with a resource configuration, the set of reference signals being received via non-full-duplex communication resources

1405

Transmit, based on measuring the set of reference signals, one or more channel state information reports in accordance with a first set of antenna ports and a second set of antenna ports, the first set of antenna ports being selected by the UE based on the resource configuration, and the second set of antenna ports being active in full-duplex communication resources, where the one or more channel state information reports include information associated with the first set of antenna ports

Figure 15:
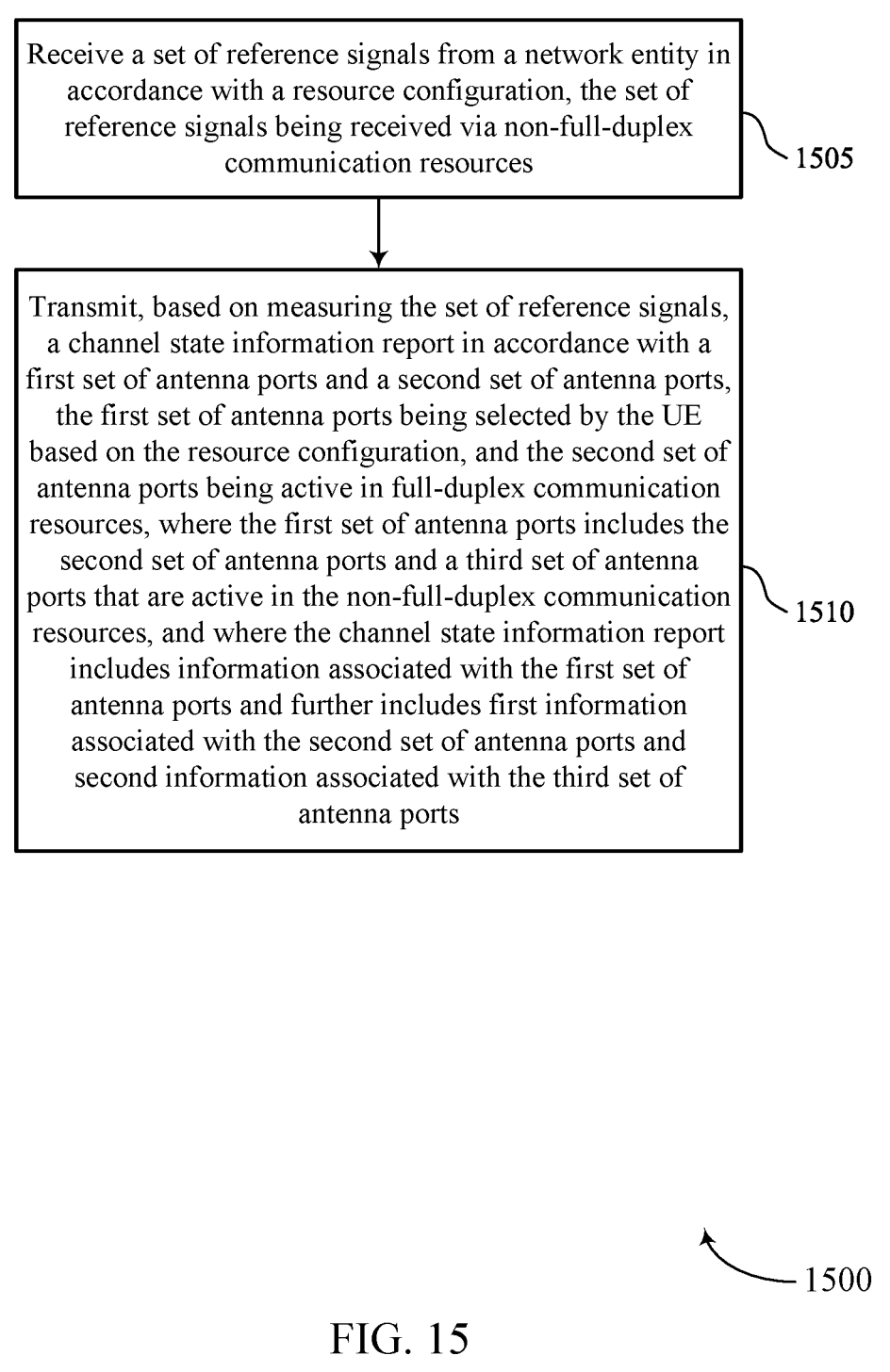

Receive a set of reference signals from a network entity in accordance with a resource configuration, the set of reference signals being received via non-full-duplex communication resources

⟩ 1505

Transmit, based on measuring the set of reference signals, a channel state information report in accordance with a first set of antenna ports and a second set of antenna ports, the first set of antenna ports being selected by the UE based on the resource configuration, and the second set of antenna ports being active in full-duplex communication resources, where the first set of antenna ports includes the second set of antenna ports and a third set of antenna ports that are active in the non-full-duplex communication resources, and where the channel state information report includes information associated with the first set of antenna ports and further includes first information associated with the second set of antenna ports and second information associated with the third set of antenna ports

Figure 16:
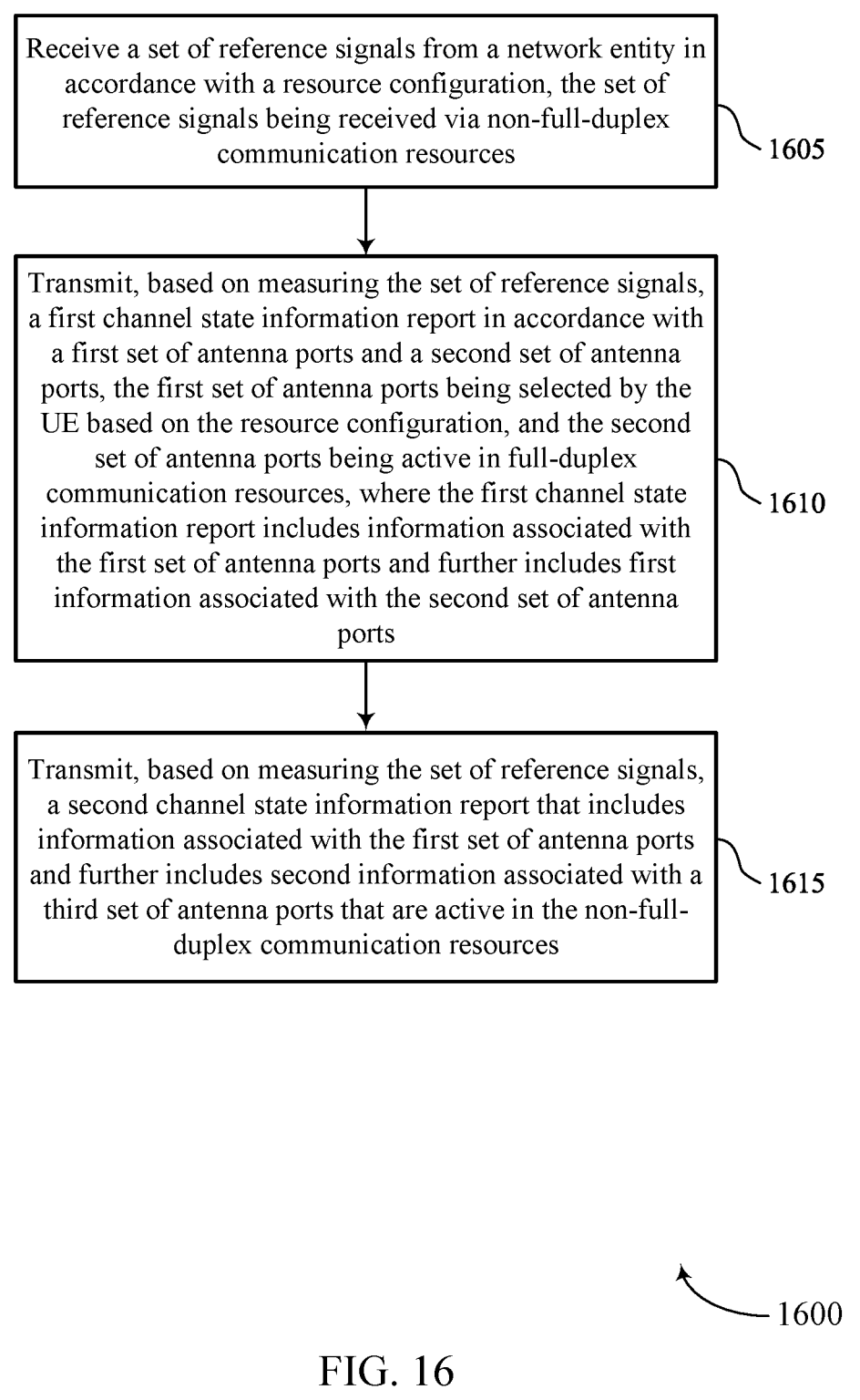

Receive a set of reference signals from a network entity in accordance with a resource configuration, the set of reference signals being received via non-full-duplex communication resources

1605

Transmit, based on measuring the set of reference signals, a first channel state information report in accordance with a first set of antenna ports and a second set of antenna ports, the first set of antenna ports being selected by the UE based on the resource configuration, and the second set of antenna ports being active in full-duplex communication resources, where the first channel state information report includes information associated with the first set of antenna ports and further includes first information associated with the second set of antenna ports

1610

Transmit, based on measuring the set of reference signals, a second channel state information report that includes information associated with the first set of antenna ports and further includes second information associated with a third set of antenna ports that are active in the non-full-duplex communication resources

Figure 17:
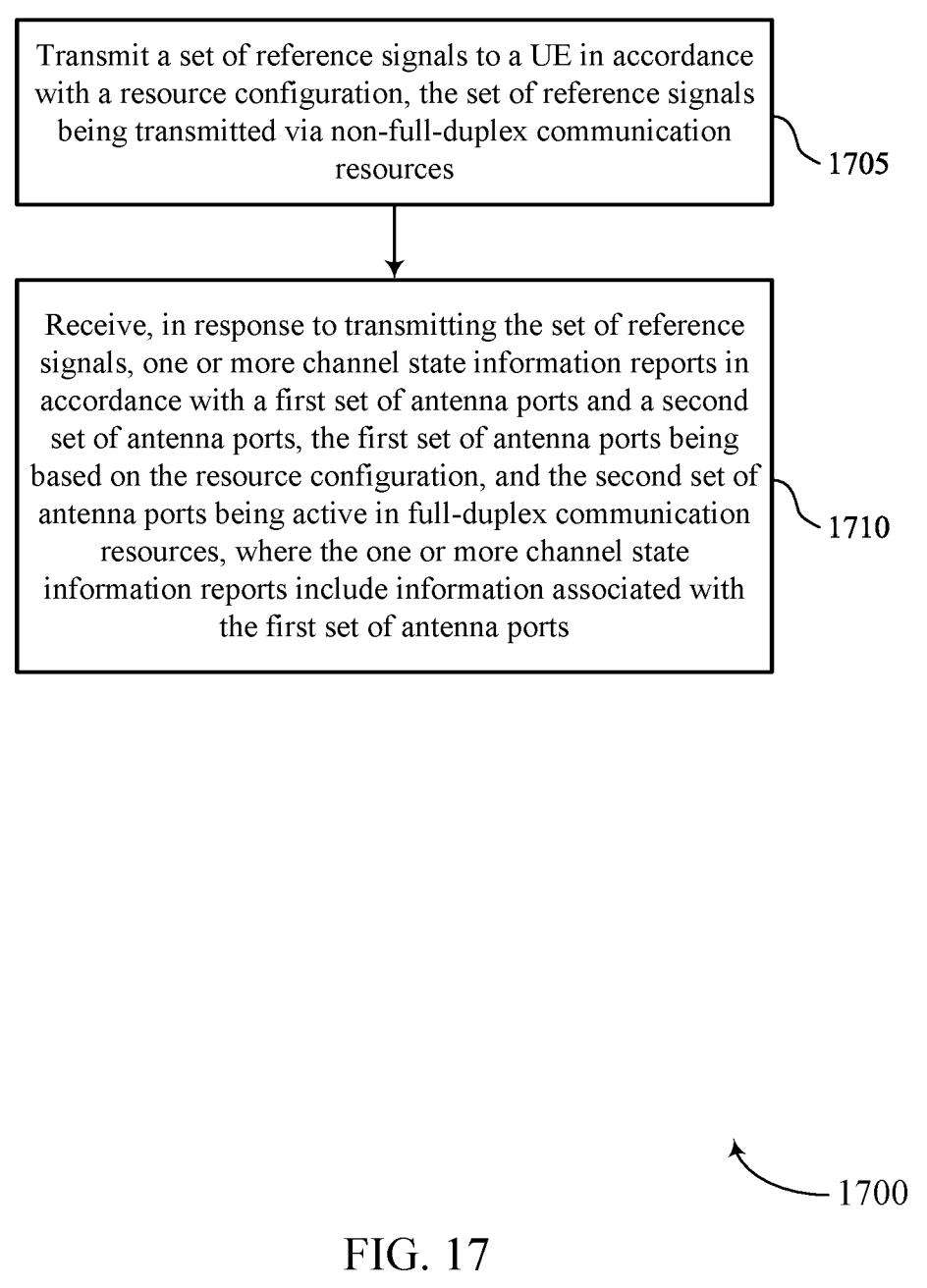

Transmit a set of reference signals to a UE in accordance with a resource configuration, the set of reference signals being transmitted via non-full-duplex communication resources

⌐ 1705

Receive, in response to transmitting the set of reference signals, one or more channel state information reports in accordance with a first set of antenna ports and a second set of antenna ports, the first set of antenna ports being based on the resource configuration, and the second set of antenna ports being active in full-duplex communication resources, where the one or more channel state information reports include information associated with the first set of antenna ports

Figure 18:
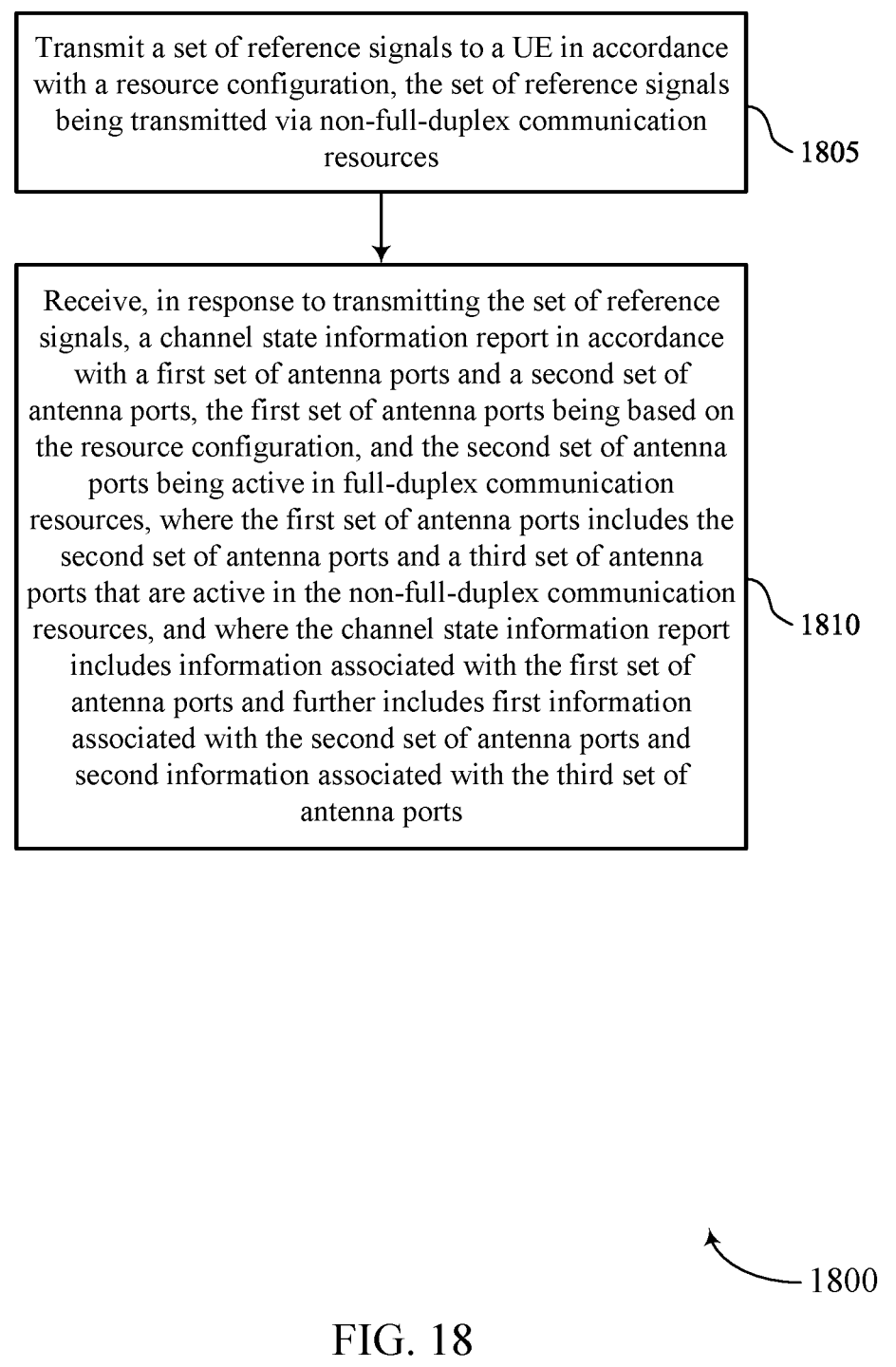

Transmit a set of reference signals to a UE in accordance with a resource configuration, the set of reference signals being transmitted via non-full-duplex communication resources ⟋1805

Receive, in response to transmitting the set of reference signals, a channel state information report in accordance with a first set of antenna ports and a second set of antenna ports, the first set of antenna ports being based on the resource configuration, and the second set of antenna ports being active in full-duplex communication resources, where the first set of antenna ports includes the second set of antenna ports and a third set of antenna ports that are active in the non-full-duplex communication resources, and where the channel state information report includes information associated with the first set of antenna ports and further includes first information associated with the second set of antenna ports and second information associated with the third set of antenna ports ⟋1810

Figure 19:
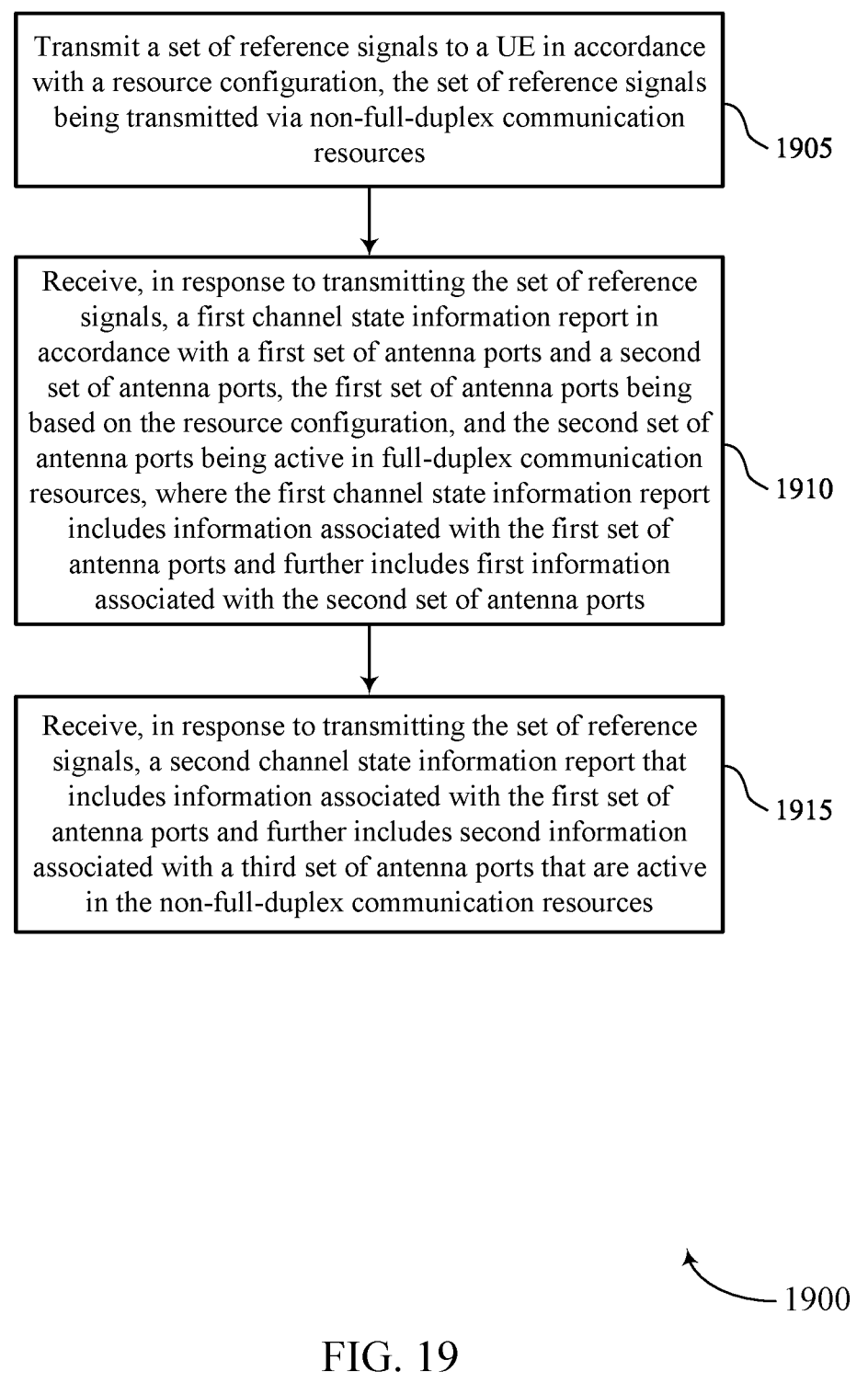

Transmit a set of reference signals to a UE in accordance with a resource configuration, the set of reference signals being transmitted via non-full-duplex communication resources

1905

Receive, in response to transmitting the set of reference signals, a first channel state information report in accordance with a first set of antenna ports and a second set of antenna ports, the first set of antenna ports being based on the resource configuration, and the second set of antenna ports being active in full-duplex communication resources, where the first channel state information report includes information associated with the first set of antenna ports and further includes first information associated with the second set of antenna ports

1910

Receive, in response to transmitting the set of reference signals, a second channel state information report that includes information associated with the first set of antenna ports and further includes second information associated with a third set of antenna ports that are active in the non-full-duplex communication resources

CHANNEL REPORTING FOR
NON-FULL-DUPLEX AND FULL-DUPLEX
MODES

FIELD OF TECHNOLOGY

The following relates to wireless communications, including channel reporting for non-full-duplex and full-duplex modes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support channel reporting for non-full-duplex (non-FD) and full-duplex (FD) modes. For example, the described techniques enable channel reporting for FD port selection and FD communication resources. For instance, a user equipment (UE) may include information indicating selected antenna ports for half-duplex (HD) (e.g., non-FD) communication resources (e.g., slots) and for FD communications resources in a report to the network entity (e.g., in a CSI report). The report may be a channel state information (CSI) report that is generated based on receiving a set of reference signals (e.g., CSI reference signals) and a resource configuration from the network entity. The UE may include an indication of the selected antenna ports for both HD and FD slots (e.g., which selected antenna ports are common antenna ports). In some examples, the UE may indicate that all selected ports are common antenna ports between HD and FD resources or that a subset of the selected antenna ports are common antenna ports. The UE may include, in the report, one or more parameters (e.g., one or more indices, a subsampling factor) associated with the selected antenna ports to indicate which antenna reports are common antenna ports (e.g., or which antenna ports are inactive for FD communications). A method for wireless communications at a user equipment (UE) is described. The method may include receiving a set of reference signals from a network entity in accordance with a resource configuration, the set of reference signals being received via non-FD communication resources and transmitting, based on measuring the set of reference signals, one or more CSI reports in accordance with a first set of antenna ports and a second set of antenna ports, the first set of antenna ports being selected by the UE based on the resource configuration, and the second set of antenna ports being active in FD communication resources, where the one or more CSI reports include information associated with the first set of antenna ports.

An apparatus for wireless communications at a UE is described. The apparatus may include a processor, memory coupled with the processor, and instructions stored in the memory. The instructions may be executable by the processor to cause the apparatus to receive a set of reference signals from a network entity in accordance with a resource configuration, the set of reference signals being received via non-FD communication resources and transmit, based on measuring the set of reference signals, one or more CSI reports in accordance with a first set of antenna ports and a second set of antenna ports, the first set of antenna ports being selected by the UE based on the resource configuration, and the second set of antenna ports being active in FD communication resources, where the one or more CSI reports include information associated with the first set of antenna ports.

Another apparatus for wireless communications at a UE is described. The apparatus may include means for receiving a set of reference signals from a network entity in accordance with a resource configuration, the set of reference signals being received via non-FD communication resources and means for transmitting, based on measuring the set of reference signals, one or more CSI reports in accordance with a first set of antenna ports and a second set of antenna ports, the first set of antenna ports being selected by the UE based on the resource configuration, and the second set of antenna ports being active in FD communication resources, where the one or more CSI reports include information associated with the first set of antenna ports.

A non-transitory computer-readable medium storing code for wireless communications at a UE is described. The code may include instructions executable by a processor to receive a set of reference signals from a network entity in accordance with a resource configuration, the set of reference signals being received via non-FD communication resources and transmit, based on measuring the set of reference signals, one or more CSI reports in accordance with a first set of antenna ports and a second set of antenna ports, the first set of antenna ports being selected by the UE based on the resource configuration, and the second set of antenna ports being active in FD communication resources, where the one or more CSI reports include information associated with the first set of antenna ports.

In some examples of the method, apparatuses, and non-transitory computer-readable medium described herein, the first set of antenna ports selected by the UE include active antenna ports that may be valid in the FD communication resources and the non-FD communication resources.

In some examples of the method, apparatuses, and non-transitory computer-readable medium described herein, a first threshold quantity of antenna ports of the first set of antenna ports may be based on a second threshold quantity of antenna ports associated with the FD communication resources.

In some examples of the method, apparatuses, and non-transitory computer-readable medium described herein, a subset of the first set of antenna ports selected by the UE include active antenna ports that may be valid in the FD communication resources and the non-FD communication resources.

In some examples of the method, apparatuses, and non-transitory computer-readable medium described herein, the subset of the first set of antenna ports may be based on a rule for which antenna ports may be active in the FD communication resources and the non-FD communication resources.

In some examples of the method, apparatuses, and non-transitory computer-readable medium described herein, the subset of the first set of antenna ports may be based on a CSI reference signal resource configuration received via a radio resource control message.

Some examples of the method, apparatuses, and non-transitory computer-readable medium described herein may further include operations, features, means, or instructions for receiving a message indicating the second set of antenna ports, where the first set of antenna ports may be selected by the UE based on the message.

In some examples of the method, apparatuses, and non-transitory computer-readable medium described herein, transmitting the one or more CSI reports may include operations, features, means, or instructions for transmitting a first indication of a first antenna port selection for the FD communication resources and transmitting a second indication of a second antenna port selection for the non-FD communication resources, the second antenna port selection being different than the first antenna port selection.

Some examples of the method, apparatuses, and non-transitory computer-readable medium described herein may further include operations, features, means, or instructions for transmitting the first indication and the second indication may be based on a first rank associated with the FD communication resources being a same rank as a second rank associated with the non-FD communication resources.

Some examples of the method, apparatuses, and non-transitory computer-readable medium described herein may further include operations, features, means, or instructions for transmitting the first indication and the second indication may be based on a first rank associated with the FD communication resources being a different rank than a second rank associated with the non-FD communication resources.

In some examples of the method, apparatuses, and non-transitory computer-readable medium described herein, transmitting the one or more CSI reports may include operations, features, means, or instructions for transmitting a first CSI report that includes first information associated with the second set of antenna ports and transmitting a second CSI report that includes second information associated with a third set of antenna ports that are active in the non-FD communication resources.

In some examples of the method, apparatuses, and non-transitory computer-readable medium described herein, the first set of antenna ports includes the second set of antenna ports and a third set of antenna ports that are active in the non-FD communication resources, and transmitting the one or more CSI reports may include operations, features, means, or instructions for transmitting a CSI report including first information associated with the second set of antenna ports and second information associated with the third set of antenna ports.

In some examples of the method, apparatuses, and non-transitory computer-readable medium described herein, the one or more CSI reports include a first index indicating a starting index of the first set of antenna ports and a second index indicating a starting index of the third set of antenna ports.

In some examples of the method, apparatuses, and non-transitory computer-readable medium described herein, the one or more CSI reports include a subsampling factor used to identify the third set of antenna ports.

A method for wireless communications at a network entity is described. The method may include transmitting a set of reference signals to a UE in accordance with a resource configuration, the set of reference signals being transmitted via non-FD communication resources and receiving, in response to transmitting the set of reference signals, one or more CSI reports in accordance with a first set of antenna ports and a second set of antenna ports, the first set of antenna ports being based on the resource configuration, and the second set of antenna ports being active in FD communication resources, where the one or more CSI reports include information associated with the first set of antenna ports.

An apparatus for wireless communications at a network entity is described. The apparatus may include a processor, memory coupled with the processor, and instructions stored in the memory. The instructions may be executable by the processor to cause the apparatus to transmit a set of reference signals to a UE in accordance with a resource configuration, the set of reference signals being transmitted via non-FD communication resources and receive, in response to transmitting the set of reference signals, one or more CSI reports in accordance with a first set of antenna ports and a second set of antenna ports, the first set of antenna ports being based on the resource configuration, and the second set of antenna ports being active in FD communication resources, where the one or more CSI reports include information associated with the first set of antenna ports.

Another apparatus for wireless communications at a network entity is described. The apparatus may include means for transmitting a set of reference signals to a UE in accordance with a resource configuration, the set of reference signals being transmitted via non-FD communication resources and means for receiving, in response to transmitting the set of reference signals, one or more CSI reports in accordance with a first set of antenna ports and a second set of antenna ports, the first set of antenna ports being based on the resource configuration, and the second set of antenna ports being active in FD communication resources, where the one or more CSI reports include information associated with the first set of antenna ports.

A non-transitory computer-readable medium storing code for wireless communications at a network entity is described. The code may include instructions executable by a processor to transmit a set of reference signals to a UE in accordance with a resource configuration, the set of reference signals being transmitted via non-FD communication resources and receive, in response to transmitting the set of reference signals, one or more CSI reports in accordance with a first set of antenna ports and a second set of antenna ports, the first set of antenna ports being based on the resource configuration, and the second set of antenna ports being active in FD communication resources, where the one or more CSI reports include information associated with the first set of antenna ports.

In some examples of the method, apparatuses, and non-transitory computer-readable medium described herein, the first set of antenna ports include active antenna ports that may be valid in the FD communication resources and the non-FD communication resources.

In some examples of the method, apparatuses, and non-transitory computer-readable medium described herein, a first threshold quantity of antenna ports of the first set of antenna ports may be based on a second threshold quantity of antenna ports associated with the FD communication resources.

In some examples of the method, apparatuses, and non-transitory computer-readable medium described herein, a subset of the first set of antenna ports selected by the UE include active antenna ports that may be valid in the FD communication resources and the non-FD communication resources.

In some examples of the method, apparatuses, and non-transitory computer-readable medium described herein, the subset of the first set of antenna ports may be based on a rule for which antenna ports may be active in the FD communication resources and the non-FD communication resources.

In some examples of the method, apparatuses, and non-transitory computer-readable medium described herein, the subset of the first set of antenna ports may be based on a CSI reference signal resource configuration transmitted via a radio resource control message.

Some examples of the method, apparatuses, and non-transitory computer-readable medium described herein may further include operations, features, means, or instructions for transmitting a message indicating the second set of antenna ports, where the first set of antenna ports may be based on the message.

In some examples of the method, apparatuses, and non-transitory computer-readable medium described herein, receiving the one or more CSI reports may include operations, features, means, or instructions for receiving a first indication of a first port selection for the FD communication resources and receiving a second indication of a second port selection for the non-FD communication resources.

Some examples of the method, apparatuses, and non-transitory computer-readable medium described herein may further include operations, features, means, or instructions for receiving the first indication and the second indication may be based on a first rank associated with the FD communication resources being as same rank as a second rank associated with the non-FD communication resources.

Some examples of the method, apparatuses, and non-transitory computer-readable medium described herein may further include operations, features, means, or instructions for receiving the first indication and the second indication may be based on a first rank associated with the FD communication resources being different than a second rank associated with the non-FD communication resources.

In some examples of the method, apparatuses, and non-transitory computer-readable medium described herein, receiving the one or more CSI reports may include operations, features, means, or instructions for receiving a first CSI report that includes first information associated with the second set of antenna ports and receiving a second CSI report that includes second information associated with a third set of antenna ports that are active in the non-FD communication resources.

In some examples of the method, apparatuses, and non-transitory computer-readable medium described herein, the first set of antenna ports includes the second set of antenna ports and a third set of antenna ports that are active in the non-FD communication resources, and receiving the one or more CSI reports may include operations, features, means, or instructions for receiving a CSI report including first information associated with the second set of antenna ports and second information associated with the third set of antenna ports.

In some examples of the method, apparatuses, and non-transitory computer-readable medium described herein, the one or more CSI reports include a first index indicating a starting index of the first set of antenna ports and a second index indicating a starting index of the third set of antenna ports.

In some examples of the method, apparatuses, and non-transitory computer-readable medium described herein, the one or more CSI reports include a subsampling factor used to identify the third set of antenna ports.

BRIEF DESCRIPTION OF THE DRAWINGS

FIG. 4 show examples of antenna port configurations that supports channel reporting for non-FD and FD modes in accordance with one or more aspects of the present disclosure.

FIGS. 14 through 19 show flowcharts illustrating methods that support channel reporting for non-FD and FD modes in accordance with one or more aspects of the present disclosure.

DETAILED DESCRIPTION

Figure 1:
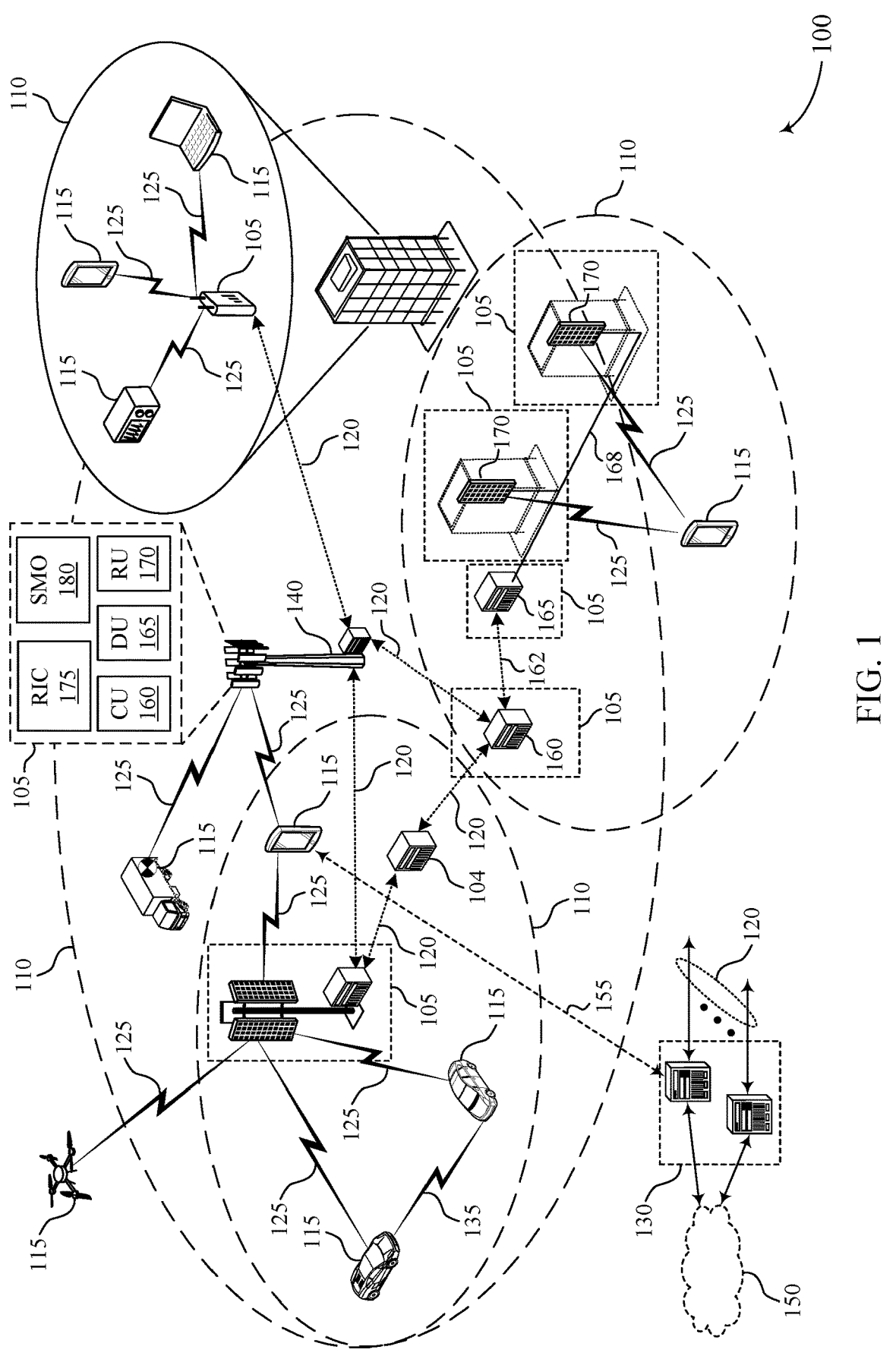
FIG. 1 through 3 show examples of wireless communications systems that support channel reporting for non-full-duplex (non-FD) and full-duplex (FD) modes in accordance with one or more aspects of the present disclosure.

In some wireless communication systems, a network entity and/or user equipment (UEs) may support communications according to a half-duplex (HD) mode (e.g., communicate during HD slots) or a full-duplex (FD) mode (e.g., communicate during FD slots), or both. Communications with other devices using either the HD or FD modes may be performed using directional transmissions (e.g., beamforming), and different transmissions may use some quantity of antenna elements within an antenna array of the transmitting device. For example, a device may include one or more antenna panels including respective antenna elements that are associated with (e.g., mapped to) a set of one or more antenna ports. Transmissions sent in accordance with the HD or FD modes may be associated with some quantity of antenna ports. In some cases, an HD transmission may be associated with a different quantity of active antenna ports than an FD transmission. For instance, each antenna port of a set of antenna ports at a device may be used for HD communications, but a subset of the set of antenna ports may be used for FD communications.

In some cases, the HD and FD modes may be associated with different channel state information (CSI) metrics. As such, the UE may transmit multiple CSI reports for the different modes (e.g., a first CSI report for all antenna ports and a second CSI report for antenna ports that are active in FD), which may be reported to the network entity either separately or together (e.g., in a single multiplexed report, or in two separate reports). Further, both HD and FD communications may be associated with the same CSI resource configuration (e.g., a same set of CSI-RS resources), which may configure CSI reference signals (CSI-RSs) in HD resources. In order for a network entity to efficiently and accurately configure communications with the UEs for both HD and FD modes, it may be beneficial for a UE to report different antenna port selection information (e.g., via a CSI report) for HD and FD resources. However, current techniques may not include mechanisms to support the indication of such antenna port selection for HD and FD communications.

According to aspects described herein, a UE may include information indicating selected antenna ports for HD communication resources (e.g., slots) and FD communications resources in a report to the network entity (e.g., in a CSI report). Here, the UE may use CSI-RSs received in HD communication resources for deriving CSI feedback for HD and FD CSI. For example, the UE may select antenna ports for communication based on a CSI-RS received from the network entity, and include an indication of which of the selected antenna ports are valid for both HD and FD slots (e.g., which selected antenna ports are common antenna ports in HD and FD resources). In some examples, the UE may indicate that all selected ports are common antenna ports between HD and FD resources. Alternatively, the UE may indicate that a subset of the selected antenna ports are common antenna ports. The UE may include the indication in one or more report messages (e.g., a single HD/FD CSI report, or in a first CSI report for common antenna ports and a second CSI report for antenna ports active in FD) based on a report configuration received from the network entity.

Additionally, or alternatively, the UE may indicate a selection of antenna ports based on a first rank associated with HD slots and a second rank associated with FD slots being a same rank or different ranks. In some examples, when HD reporting and FD reporting are multiplexed into a single report, the UE may include, in the report, one or more parameters (e.g., one or more indices, a subsampling factor) associated with the selected antenna ports to indicate which antenna reports are common antenna ports (e.g., or which antenna ports are inactive for FD communications). Including information related to the common antenna ports of the selected antenna ports may decrease signaling and processing overhead and thereby reduce power consumption and increase system efficiency. Further, the techniques described herein may enable higher data rates, higher data capacity, and increased spectral efficiency.

Aspects of the disclosure are initially described in the context of wireless communications systems. Aspects of the disclosure are further illustrated by and described with reference to apparatus diagrams, system diagrams, and flowcharts that relate to channel reporting for non-full-duplex and full-duplex modes.

FIG. 1 shows an example of a wireless communications system 100 that supports channel reporting for non-full-duplex and full-duplex modes in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein. The wireless communications system 100 may support enhanced CSI reporting techniques, including the derivation of CSI for both HD and FD resources based on reference signals received in HD slots.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support channel reporting for non-full-duplex and full-duplex modes as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for auto-mated communication between machines (e.g., via Machine-to-Machine (M2M) communication). M2M com-munication or MTC may refer to data communication tech-nologies that allow devices to communicate with one another or a network entity 105 (e.g., a base station 140) without human intervention. In some examples, M2M com-munication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way com-munication via transmission or reception, but not transmis-sion and reception concurrently). In some examples, half-duplex communications may be performed at a reduced peak rate. Other power conservation techniques for the UEs 115 include entering a power saving deep sleep mode when not engaging in active communications, operating using a lim-ited bandwidth (e.g., according to narrowband communica-tions), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be con-figured to support ultra-reliable communications or low-latency communications, or various combinations thereof. For example, the wireless communications system 100 may be configured to support ultra-reliable low-latency commu-nications (URLLC). The UEs 115 may be designed to support ultra-reliable, low-latency, or critical functions. Ultra-reliable communications may include private commu-nication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accor-dance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communi-cating via D2D communications may support a one-to-many (1:M) system in which each UE 115 transmits to each of the other UEs 115 in the group. In some examples, a network entity 105 may facilitate the scheduling of resources for D2D communications. In some other examples, D2D com-munications may be carried out between the UEs 115 without an involvement of a network entity 105.

The core network 130 may provide user authentication, access authorization, tracking, Internet Protocol (IP) con-nectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external net-works (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental fea-tures, which may be referred to as clusters, but the waves may penetrate structures sufficiently for a macro cell to provide service to the UEs 115 located indoors. Communi-cations using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also oper-ate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support mil-limeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with rows and columns of respective antenna elements that are mapped to antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via a set of antenna ports. In some cases, an antenna port may represent a particular channel model, and two or more symbols transmitted via an antenna port may be subject similar propagation conditions. In some aspects, an antenna port may be referred to as an antenna.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Some wireless communications systems 100 may support HD communications, in which a UE 115 and a network entity 105 may transmit and receive uplink and downlink communications via separate frequency bands. For example, if a network entity 105 is engaging in downlink communications, the network entity 105 may filter out any signaling that is incoming from a UE 115 via an uplink band. Additionally, or alternatively, the wireless communications system 100 may support FD communications in time domain division (TDD) bands. FD communications in TDD bands may increase an uplink duty cycle, which may result in latency improvements for access and IAB links as well as improvements to uplink coverage. In addition, FD communications in TDD bands may enhance system capacity, and enable flexible and dynamic uplink and downlink resource adaptation according to uplink and downlink traffic, which may solve particular challenges of TDD communications. In some cases, FD operation may be implemented based on a reduced quantity of digital ports (e.g., antenna ports) in FD slots as compared to HD slots (e.g., 32 ports in HD and 16 ports in FD). Additionally, or alternatively, a radiation pattern may be different in FD/HD slots.

In some examples, the wireless communications system 100 may support sub-band full-duplex (SBFD) communications, in which a UE 115 and a network entity 105 may perform simultaneous transmission and reception of downlink and uplink communications on a frequency sub-band basis (e.g., across a set of frequencies). For example, the network entity 105 may partition a particular band (e.g., 100 MHz) into sub-bands which may be used exclusively for uplink or downlink communications. For example, 40 MHz of a 100 MHz band may be used for downlink communications, 20 MHz may be used for uplink communications, and another 40 MHz may be used for downlink communications. That is, the uplink and downlink bands may have relatively similar frequencies, however, may be non-overlapping in frequency. SBFD communications may be suitable for macro cells with a relatively large transmit power and may be relatively simpler to enable than other full-duplex techniques. In addition, SBFD communications may improve latency and increase uplink coverage via FDD in TDD bands.

To further enhance flexibility of some operations, the wireless communications system 100 may support network entities 105, UEs 115, or both that may perform simultaneous transmission and reception of downlink and uplink communications via partially or fully overlapping frequency bands. For example, the wireless communications system 100 may support a UE 115 and a network entity 105 that operate using FD communications via partially overlapping frequency bands, or a network entity 105 that operates using HD communications (e.g., in a multi-TRP (mTRP)) scenario) and a UE 115 that operates using SBFD communications.

In a TDD scenario, network entities 105 in the wireless communications system 100 may support SBFD operations (e.g., where uplink and downlink sub-bands are non-overlapping in frequency), while UEs 115 may support HD communications. For example, the network entity 105 may use a particular sub-band for transmitting downlink communications to a first UE 115, and a particular sub-band for receiving simultaneous uplink communications from a second UE 115. As such, a UE 115 capable of HD communications may be paired with any network entity 105 capable of SBFD operations in the wireless communications system 100. Additionally, or alternatively, both network entities 105 and UEs 115 may support FD communications.

In some examples, the network entity 105 (e.g., or UEs 115) may use in-band full-duplex (IBFD) communications, in which the network entity 105 may transmit and receive communications with a UE 115 (e.g., or a network entity 105) via a same time resource and a same frequency resource. That is, the downlink and uplink may share same IBFD time and frequency resources, which may partially or fully overlap. Similarly, a UE 115 and network entity 105 may communicate using single-frequency full-duplex (SFFD) communications, which may enable simultaneous uplink and downlink transmissions on the same frequency resources (e.g., fully overlapping frequency and time resources). SFFD operations may enhance the flexibility of system operation, and such operations may be supported based on one or more conditions being satisfied, such as when a relatively large spatial isolation is achieved. Here, communications may fall back to FDM and/or SDM operation when the conditions are not satisfied. Additionally, or alternatively, the network entity 105 may use sub-band FDD (e.g., flexible duplex, SBFD) communications, in which the network entity 105 may transmit and receive communications with the UE 115 via a same time resource but via different frequency resources. That is, a frequency resource used for downlink communications may be separated from a frequency resource used for uplink communications (e.g., by a guard band).

In some cases, HD resources and FD resources may be associated with different CSI metrics and different antenna ports (e.g., antennas) at the network entity 105 and the UE 115. In order for a network entity 105 to efficiently and accurately configure communications with the UEs 115 for both HD and FD modes, it may be desirable for a UE 115 to report different antenna port selection information (e.g., via a CSI report) for HD and FD resources. However, conventional techniques may not include mechanisms to support the indication of such antenna port selection for both HD and FD communications. According to aspects described herein, a UE 115 may include information indicating selected antenna ports for HD slots and FD slots in one or more reports to the network entity 105 (e.g., CSI reports).

The UE 115 may select antenna ports for communication based on one or more received CSI-RSs and a resource configuration, and the UE 115 may include information associated with the selection of antenna ports in one or more CSI repots. For example, the UE 115 may include an indication of which of the selected antenna ports are valid for HD slots, for FD slots, or both HD and FD slots. Additionally, or alternatively, the UE may indicate a selection of antenna ports based on ranks associated with HD slots and the FD slots being a same rank or different ranks. In some examples, when HD reporting and FD reporting are multiplexed into a single report, the UE may include, in the report, one or more parameters (e.g., one or more indices, a subsampling factor, or both) associated with the selected antenna ports to indicate which antenna reports are common antenna ports (e.g., or which antenna ports are inactive for FD communications).

Figure 2:
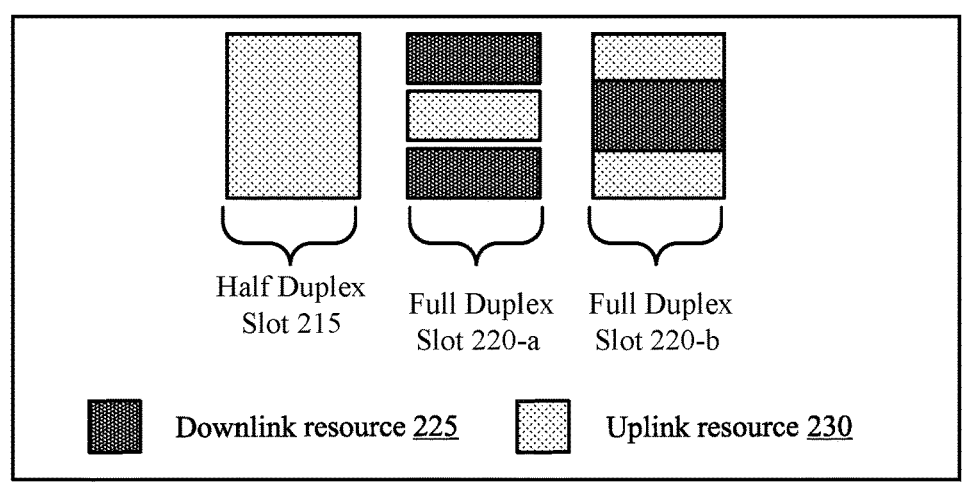

FIG. 2 shows an example of a wireless communications system 200 that supports channel reporting for non-FD and FD modes in accordance with one or more aspects of the present disclosure. In some examples, the wireless communications system 200 may implement aspects of the wireless communications system 100 or may be implemented by aspects of the wireless communications system 100. For example, the wireless communications system 200 may include a UE 115-a and a network entity 105-a, which may be examples of corresponding devices described herein. In some examples, the UE 115-a and the network entity 105-a may support channel reporting that includes information related to selected antenna ports (e.g., antennas) that are active in both non-FD (e.g., HD) communication resources and FD communication resources (e.g., antenna ports common to both non-FD and FD modes) to enhance CSI measurements and CSI feedback. Such channel reporting may provide increase efficiency in the wireless communications system 200 by decreasing signaling and processing overhead.

The wireless communications system 200 may support communications between the UE 115-a and the network entity 105-a, where the UE 115-a and the network entity 105-a may use FD communication resources (e.g., the network entity 105-a and the UE 115-a may receive uplink messages and transmit downlink messages simultaneously), HD communication resources (e.g., the UE 115-b may receive downlink messages or transmit uplink messages at a given time), or both. For example, the UE 115-a may communicate with the network entity 105-a via an uplink 205 and a downlink 210. The uplink 205 and the downlink 210 may be examples of communication links 125 described with reference to FIG. 1. In some cases, the UE 115-a and the network entity 105-a may experience self-interference or cross link interference (CLI), which may be caused by a traffic imbalance between the uplink 205 and the downlink 210 or by interference from another UE (not shown).

HD communication resources (non-FD communications resources) may include HD slots 215. The HD slots 215 may include a single band configured for downlink transmissions (e.g., a downlink resource 225) or for uplink transmissions (e.g., an uplink resource 230). FD communication resources may include FD slots 220 (e.g., FD slot 220-a, FD slot 220-b), which may be associated with different FD slot types. For example, the FD slot 220-a may be an SBFD slot (e.g., a D+U slot), which may include a first subband configured for downlink transmissions (e.g., a downlink resource 225), a second subband configured for uplink transmissions (e.g., an uplink resource 230), and a third subband also configured for downlink transmissions (e.g., a downlink resource 225), where the subbands are non-overlapping. The FD slot 220-b may be an IBFD slot, which may include a first subband configured for downlink transmissions (e.g., a downlink resource 225) and a second subband configured for uplink transmissions (e.g., an uplink resource 230), where the subbands may be at least partially overlapping (e.g., overlapping in time and/or frequency resources). In some examples, the uplink and downlink subbands in the FD slots 220 may enable the network entity 105-a to communicate with the UE 115-a via the uplink 205 and the downlink 210 simultaneously.

In some cases, the network entity 105-a and the UE 115-a may include one or more antenna panels including respective antenna elements that are associated with (e.g., mapped to) one or more antenna ports to perform communications (e.g., beamformed communications, MIMO communications). For example, the network entity 105-a may transmit one or more CSI-RSs using one or more CSI-RS-specific antenna ports, which may be referred to as CSI-RS ports. The quantity of CSI-RS ports supported by an antenna panel may be based on the quantity and configuration of antenna elements and may further depend on the total quantity of antenna panels.

To support FD communications, an antenna panel (e.g., of a network entity 105-*a*) may be divided (e.g., split) into one or more sub-panels, where a first sub-panel may support transmitting operations and a second sub-panel may support receiving operations. In such cases, the CSI-RS ports associated with the antenna panel may be distributed between the first sub-panel and the second sub-panel according to different techniques. For example, each sub-panel may include a same quantity of CSI-RS ports as the quantity of CSI-RS ports used by the full antenna panel (e.g., an undivided antenna panel), where the sub-panels may use a relatively lower power per-port than the full panel. Alternatively, each sub-panel may include a portion of the quantity of CSI-RS ports used by the full antenna panel (e.g., each panel includes half the quantity of CSI-RS ports of the full panel, each panel includes a different portion of the quantity of CSI-RS ports), where the sub-panels use a same power per-port as the full panel. As an example, a network entity 105-*a* may include 128 antenna elements (e.g., cross polarized (xpol) antenna elements) (16×8) mapped to 32 transceiver units (TXRUs) (2×8) by an 8×1 combiner in vertical. In a first distribution, each sub-panel may include 64 antenna elements mapped to 32 TXRUs (2×8) by a 4×1 combiner. In a second distribution, each sub-panel may include 64 antenna elements mapped to 16 TXRUs (1×8) by 8×1 combiner.

In some cases, the UE 115-*a* may perform one or more channel measurements of a communication link (e.g., the uplink 205, the downlink 210, or both) to determine a channel quality associated with the communication link. For instance, the network entity 105-*a* may transmit a set of reference signals 240 (e.g., CSI-RSs) to the UE 115-*a* (e.g., in an HD slot 215) for the UE 115-*a* to use in determining a channel estimate that is used to assist in link adaptation. The UE 115-*a* may perform one or more channel measurements (e.g., CSI measurements) based on the set of received reference signals 240 and may transmit one or more reports 245 (e.g., CSI reports) to the network entity 105-*a*. Based on the one or more reports 245 (e.g., report 245-*a*, report 245-*b*, report 245-*c*), the UE 115-*a*, the network entity 105-*a*, or both, may adapt transmission parameters to maintain a reliable communication link between the UE 115-*a* and the network entity 105-*a*.

In some cases, the network entity 105-*a* may transmit a configuration message 235 (e.g., an RRC configuration, a resource configuration, a CSI-RS resource configuration (such as CSI-resourceConfig)) for the set of reference signals 240 and for the one or more reports 245. The configuration message 235 may include information associated with resources (e.g., antenna ports) used for communicating the set of reference signals 240 and the one or more reports 245. For example, the configuration message 235 may indicate a configured set of CSI measurement resources, as well as any other resource settings (e.g., frequency resources, antenna port settings, quantity of CSI-RS ports, configuration of CSI-RS ports) that the UE 115-*a* may select based on channel and interference measurements performed in accordance with the configuration message 235. In some cases, the configuration message 235 may further indicate whether port selection associated with the CSI-RS resource is associated with non-precoding matrix indicator (non-PMI) feedback or for PMI feedback (e.g., Type II, codebook based).

Based on the configuration message 235, the UE 115-*a* may perform channel estimation (CE) and port selection to select antenna ports for the network entity 105-*a* and the UE 115-*a* to use for communications. In some cases, the network entity 105-*a* and/or the UE 115-*a* may include multiple antenna ports, where a first set of antenna ports are used for HD communications (e.g., HD-only ports) and a second set of antenna ports are used in both HD and FD communications, which may be referred to as common antenna ports. In some methods, the network entity 105-*a* may configure (e.g., via the configuration message 235) CSI-RS resources during HD slots 215. As such, a quantity of ports for the CSI-RS may be the same as a quantity of ports supports in an HD slot 215 (e.g., 32 ports in HD slots). In such cases, an antenna port mapping may be the same for common ports in HD slots 215 and FD slots 220 (e.g., a first half of the antenna ports mapped to antenna elements may be fixed). To obtain channel information associated with FD slots 220, the network entity 105-*a* may transmit a second configuration message 235 and a second set of reference signals 240, and the UE 115-*a* may perform a second CE procedure, which may increase overhead in the wireless communications system 200.

In addition, depending on the port selection, HD slots 215 and FD slots 220 (e.g., HD and FD modes) may be associated with different CSI metrics. For example, CSI metrics may be different across SBFD symbols and non-SBFD symbols in different slots (e.g., each CSI-RS resource within a slot may correspond to either all SBFD symbols or all non-SBFD symbols). Thus, various methods may be used to report the different CSI metrics for the different modes. For instance, the UE 115-*a* (e.g., an SBFD aware UE) may generate and transmit one or more reports 245 (e.g., associated with periodic or semi-persistent CSI-RSs) according to various methods. For instance, in a first method, the UE 115-*a* may combine information for the different CSI metrics (e.g., for HD ports and common HD/FD ports, for SBFD symbols and non-SBFD symbols) in a same report 245-*a* (e.g., in a single CSI report configuration, in same CSI reporting), where the same report 245-*a* may be linked to a resource configuration 255-*a* (e.g., CSI-RS resource configuration, CSI-resourceConfig1, NZP-CIS-RS-Resource-Set, CSI-Resource). In a second method, the UE 115-*a* may separate CSI reporting for HD and FD communication modes (e.g., for SBFD symbols and non-SBFD symbols). That is, the UE 115-*a* may transmit a first report 245-*b* (e.g., a first CSI report configuration) that includes first information (e.g., for CSI metrics common to both HD and FD, for SBFD symbols) and a second report 245-*c* (e.g., a second CSI report configuration) that includes second information (e.g., for CSI metrics for HD only, for non-SBFD symbols), where the first report 245-*b* and the second report 245-*c* may be linked to a same resource configuration 255-*b* (e.g., CSI-resourceConfig1, NZP-CIS-RS-ResourceSet, CSI-Resource).

In some cases, to reduce overhead associated with CSI-RS resources, it may be desirable for the UE 115-*a* to report CSI metrics associated with both HD slots 215 and FD slots 220-*a* and/or 220-*b* (e.g., and report different port selection for HD and HD/FD resources in a same CSI report) based on a single resource configuration 255 (e.g., CSI-RS resource configuration). For example, the UE 115-*a* may perform CE measurements during HD slots 215 and apply the CE measurements to FD slots 220 to increase efficiency. In addition, the network entity 105-*a* may configure repetition of downlink messages (e.g., PDSCH aggregation) across slots of differing types (e.g., HD slots 215 and FD slots 220). If common antenna ports are not selected for repetition across slots, the resources for transmission of the downlink transmission may be invalid (e.g., HD port may be selected during a FD slot 220). As such, configuring the repetition of downlink messages on antenna ports which are active (e.g., valid) in both HD slots 215 and FD slots 220 may further increase efficiency. However, current methods may not support any mechanism for the UE 115-*a* to indicate information associated with which antenna ports (e.g., of the selected antenna ports) are active in FD slots 220 (e.g., common selected antenna ports).

According to aspects described herein, a UE 115-*a* may perform port selection for CSI reporting based on HD and FD communication modes and may include information indicating which of the selected antenna ports (e.g., CSI-RS ports) are active (e.g., valid) in FD (e.g., and HD) communication resources in a report 245 (e.g., a CSI report) to the network entity 105-*a*. For example, the UE 115-*a* may perform the techniques described herein as part of a report generation procedure 260 (e.g., including channel measurement and port selection). Such reporting may be applicable in rank-nested and non-rank-nested cases, as well as in cases of a single report 245-*a* (e.g., HD and FD CSI information multiplexed in a single CSI report) and where multiple CSI reports (e.g., a first report 245-*b* and a second report 245-*c*) are used. In some examples, the UE 115-*a* may select antenna ports that are active in both HD slots 215 and FD slots 220, and the UE 115-*a* may report (e.g., via a CSI report) that all of the selected antenna ports are valid in both HD slots 215 and FD slots 220 (e.g., SBFD slots). In such examples, a threshold (e.g., maximum) quantity of CSI-RS ports may be the same as a quantity of CSI-RS ports that are available in FD slots 220.

In some other examples, the port selection of the UE 115-*a* may include antenna ports that are active in HD slots 215 and FD slots 220 as well as antenna ports that are active in HD slots 215 only. In such examples, the UE 115-*a* may indicate which of the selected antenna ports (e.g., a subset of the selected antenna ports) are valid in both HD slots 215 and FD slots 220. In some examples, the antenna ports that are active (e.g., for FD slots, for HD slots, or both) may be defined (e.g., preconfigured) by an industry standard (e.g., half of the ports are active in HD slots 215 and FD slots 220) or may be configurable by the network entity 105-*a* (e.g., via an RRC configuration for a CSI-RS resource, via the configuration message 235).

In some examples (e.g., in non-PMI based reporting), the UE 115-*a* may report different port selections for HD slots 215 and FD slots 220. Such reporting may be based on whether a port selection is the same between HD slots 215 and FD slots 220, such as described in further detail herein including with reference to FIG. 3. Additionally, or alternatively, when CSI information for both HD slots 215 and FD slots 220 is multiplexed into a single CSI report (e.g., report 245-*a*), the UE 115-*a* may include additional parameters in the report 245 to indicate antenna ports active in both HD slots 215 and FD slots 220. Additional details related to the multiplexed CSI report are described herein including with reference to FIG. 4. Channel reporting for HD (e.g., non-FD) and FD modes according to techniques described herein may increase efficiency in the wireless communications system 200. For instance, the described techniques may decrease signaling and processing overhead associated with channel estimation thereby reducing power consumption and increasing system performance.

Figure 3:
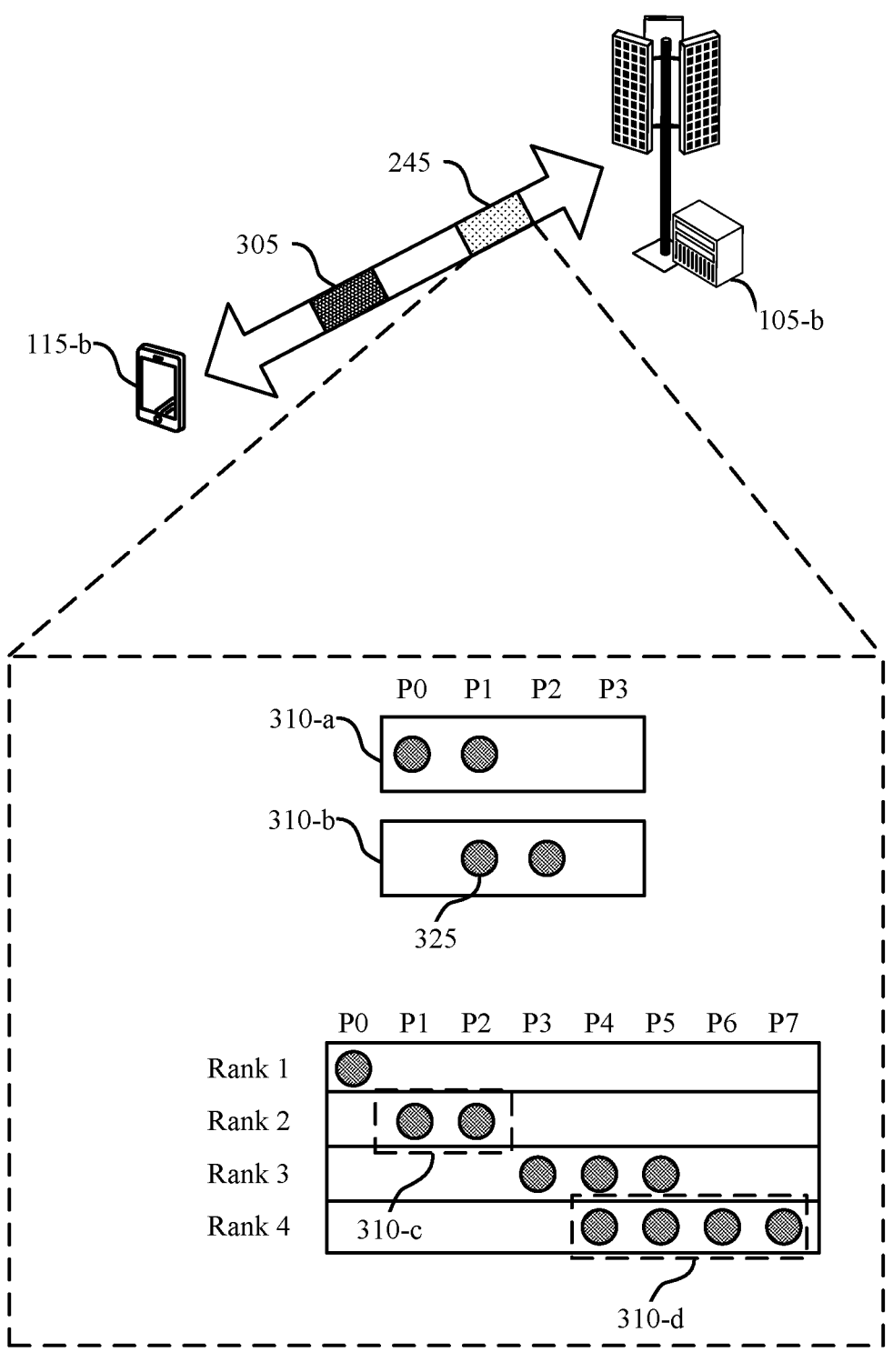

FIG. 3 shows an example of a wireless communications system 300 that supports channel reporting for non-FD and FD modes in accordance with one or more aspects of the present disclosure. In some examples, the wireless communications system 300 may implement or be implemented by aspects of the wireless communications system 100 or the wireless communications system 200. For example, the wireless communications system 300 may include a UE 115-*b* a and a network entity 105-*b*, which may be examples of corresponding devices described herein. In some examples, the UE 115-*b* and the network entity 105-*b* may support channel reporting and antenna port selection, which may be referred to herein as port selection, according to aspects described herein, which may provide increase efficiency.

The UE 115-*b* may transmit one or more reports 245 (e.g., CSI reports) to the network entity 105-*b*. The one or more reports 245 may be based on receiving a configuration message (e.g., a configuration message 235) and a set of reference signals (e.g., set of reference signals 240) as described with reference to FIG. 2. In some cases, port selection by a UE 115-*b* may be based on information in the configuration message 235 (e.g., or some other configuration information) indicating whether the CSI-RS resource configuration is associated with port selection (e.g., antenna port selection) for PMI feedback (e.g., codebook based, Type II) or non-PMI feedback (e.g., non-codebook based) and based on ranks associated with HD slots and FD slots (e.g., HD slots 215 and FD slots 220).

In some cases, port selection may be associated with PMI feedback. PMI feedback based port selection may support a quantity of antenna ports, P, (e.g., in {4, 8, . . . , 32} and up to a specific rank (e.g., rank 2 or rank 4). In such cases, a first half of antenna ports may be assigned to a first polarization. A quantity of selected antenna ports, L, (e.g., in {2, 3, 4}) may be supported per polarization, where ports are selected starting at an index, n, for the first half of antenna ports. Subsequent antenna ports may be selected according to a port selection step, d, (e.g., in {1, 2, 3, 4}). A same selection may be repeated for a second half of the antenna ports (e.g., ports P/2+n and so on). The L antenna ports per polarization may be selected by an index $i_{1,1}$, based on a quantity of CSI-RS antenna ports, $P_{CSI-RS}$, and d, where $$i_{1,1} \in \left\{ 0, 1, \dots, \left[ \frac{P_{CSI-RS}}{2d} \right] - 1 \right\}.$$

For example, a configuration with P=8, L=2, d=2, and n=1 may result in a first half including 4 antenna ports (e.g., indexed from 1 to 4) with selected ports at indices 1 and 4, and a second half including 4 antenna ports (e.g., indexed from 5 to 8) with selected ports at indices 6 and 8.

Further, PMI feedback based port selection may be associated with a defined format. For example, the antenna ports may be identified as {3000, 3001, . . . , 3003} for 4 antenna ports, {3000, 3001, . . . , 3007} for 8 antenna ports, {3000, 3001, . . . , 30011} for 12 antenna ports, {3000, 3001, . . . , 30015} for 16 antenna ports, {3000, 3001, . . . , 30023} for 24 antenna ports, and {3000, 3001, . . . , 30031} for 32 antenna ports. In some cases, the UE 115-*b* may be configured with a first higher layer parameter (e.g., codebookType) set to a defined value (e.g., 'typeII-PortSelection'). A quantity of CSI-RS ports may be given by $P_{CSI-RS} \in$ {4, 8, 12, 16, 24, 32} as configured by a second higher layer parameter (e.g., nrofPorts). A value of L may be configured by a third higher layer parameter (e.g., numberOfBeams), where L=2 when $P_{CSI-RS}$=4 and L E {2, 3, 4} when $P_{CSI-RS}$>4. A value of d may be configured by a fourth higher layer parameter (e.g., portSelectionSamplingSize), where d∈ {1, 2, 3, 4} and $$d \leq \min\left( \frac{P_{CSI-RS}}{2}, L \right).$$

In some cases, port selection may be associated with non-PMI feedback. Such cases may be associated with a reporting quantity (e.g., CSI-RS resource indicator-rank indicator-channel quality information (cri-RI-CQI)). The port selection may be associated with rank-nested port mapping or non-nested port mapping, where a rank may indicate a quantity of antenna ports (e.g., selected antenna ports 325). In rank-nested port mappings, port selection for subsequent ranks may include the selected antenna ports from a previous (e.g., lower) rank as well as an additional selected antenna port. For example, for rank 1, rank 2, and rank 3 and ports P0, P1, and P2, rank 1 may include P0, rank 2 may include P0 and P1, and rank 3 may include P0, P1, and P2. In non-nested port mappings, port selection for subsequent ranks may not include the selected antenna ports from previous ranks. For example, for rank 1, rank 2, rank 3, and rank 4 and ports, P0, P1, P2, P3, P4, P5, P6, and P7, rank 1 may include P0, rank 2 may include P1 and P2, rank 3 may include P3, P4, and P5, and rank 4 may include P4, P5, P6, and P7.

In some cases, the CSI-RS port that is to be used for a certain rank hypothesis may be indicated in a CSI report setting (e.g., via a non-PMI-PortIndication field). Further, for singular value decomposition (SVD)-based precoding, a rank-nested property may hold. However, the rank-nested property may not hold for more advanced precoding schemes. In some cases, the port indication may allow a single CSI-RS resource to be shared among multiple UEs so that a single UE (e.g., UE 115-*b*) uses a subset of the CSI-RS ports within the resource. In some cases, the UE 115-*b* may be configured (e.g., with a CSI-ReportConfig) with a first higher layer parameter (e.g., reportQuantity) set to a value (e.g., 'cri-RI-CQI').

In such cases, if the UE 115-*b* is configured with a second higher layer parameter (e.g., non-PMI-PortIndication) contained in a report configuration (e.g., CSI-ReportConfig), r ports may be indicated in the order of layer ordering for rank r and each CSI-RS resource in the CSI resource setting may be linked to the report configuration based on the order of the associated parameter (e.g., NZP-CSI-RS-ResourceId) in the linked CSI resource setting for channel measurement given by a third higher layer parameter (e.g., resources-ForChannelMeasurement). In some cases, the second higher layer parameter may contain a sequence (e.g., $P_0^{(1)}$, $P_0^{(2)}$, $P_1^{(2)}$, $P_0^{(3)}$, $P_1^{(3)}P_2^{(3)}$, . . . , $P_0^{(R)}$, $P_1^{(R)}$, . . . , $P_{R-1}^{(R)}$ of port indices, where $P_0^{(v)}$, . . . , $P_{v-1}^{(v)}$ are the CSI-RS port indices associated with rank v and R∈{1, 2, . . . , P}, where P∈{1, 2, 4, 8} is the quantity of ports in the CSI-RS resource. The UE 115-*b* may report RI corresponding to configured fields of a parameter (e.g., PortIndexFor8Ranks). Alternatively, if the UE115-*b* is not configured with the second higher layer parameter (e.g., non-PMI-PortIndication), the UE 115-*b* may assume, for each CSI-RS resource in the CSI resource setting linked to the resource configuration (e.g., CSI-ReportConfig), that the CSI-RS port indices $P_0^{(v)}$, . . . , $P_{v-1}^{(v)}$={0, . . . , v-1} are associated with ranks, v=1, 2, . . . , P where P∈{1, 2, 4, 8} is the quantity of ports in the CSI-RS resource. However, conventional port selection and reporting of the port selection may not support any mechanism to differentiate ports that are valid in HD slots and ports that are valid in FD slots, which may lead to increased signaling overhead.

According to aspects described herein, in some examples (e.g., in non-PMI port indication), a UE 115-*b* may report different port selection (e.g., selected antenna ports 325) for HD slots and FD slots based on a first rank for FD slots and a second rank for HD slots being a same rank or a different rank. In some examples, the UE may receive a message 305 (e.g., from the network entity 105-*b*) that indicates which antenna ports are valid in FD slots. The message 305 may be included in a configuration message 235 or some other signaling. The UE 115-*b* may a perform port selections 310 based on the message 305. In addition, the UE 115-*b* may report different port selection for HD slots and FD slots (e.g., via a first indication for FD slots and a second indication for HD slots) and may report the port selections 310 via the one or more reports 245.

In some examples, the UE 115-*b* may perform a port selection 310-*a* and a port selection 310-*b*, which may assume that a first rank for FD slots and a second rank for HD slots are a same rank (e.g., common rank for FD/HD, the UE 115-*b* may report a same rank for HD and FD slots). For example, the UE 115-*b* may assume a common rank (e.g., rank 2) and may include the port selection 310-*a* for HD resources (e.g., ports P0 and P1) and the port selection 310-*b* for FD resources (e.g., ports P1 and P2) different that the first port selection. The UE 115-*b* may include a first indication of the port selection 310-*a* and a second indication of the port selection 310-*b* in the one or more reports 245. In some examples, the selected antenna ports 325 may be different between HD slots and FD slots due to some antenna ports being unavailable in FD slots (e.g., port P0 may not be available for FD slots, as indicated by the message 305). Such reporting may, in some cases, assume a same quantity of layers may be supported with reduced ports in FD with reasonable performance (e.g., 2 layers with 8 HD ports and 4 FD ports).

Alternatively, in some examples, the UE 115-*b* may perform a port selection 310-*c* and a port selection 310-*d*, which may assume that a first rank for FD slots and a second rank for HD slots are different ranks (e.g., the UE 115-*b* may report different ranks for HD slots and FD slots). In such cases, the UE 115-*b* may report different port selections according to different ranks for HD and FD slots, and port reduction in FD slots may utilize rank reduction (e.g., to achieve improved performance). For example, rank 2 may be used for FD slots, and rank 4 may be used for HD slots. The message 305 may indicate that antenna ports P0, P1, and P2 are active during FD slots. As such, the port selection 310-*c* may include ports P1 and P2 for FD slots and the port selection 310-*d* may include ports P4, P5, P6, and P7 for HD slots. Additionally, or alternatively, the UE 115-*b* may use rank reduction to select, for example, P0 for FD slots, and the UE 115-*b* may select a combination of any ports for HD slots (e.g., due to all ports being active in HD slots). Including port selection according to HD slots and FD slots and their associated ranks may increase flexibility and efficiency in the wireless communications system 300

Figure 4:
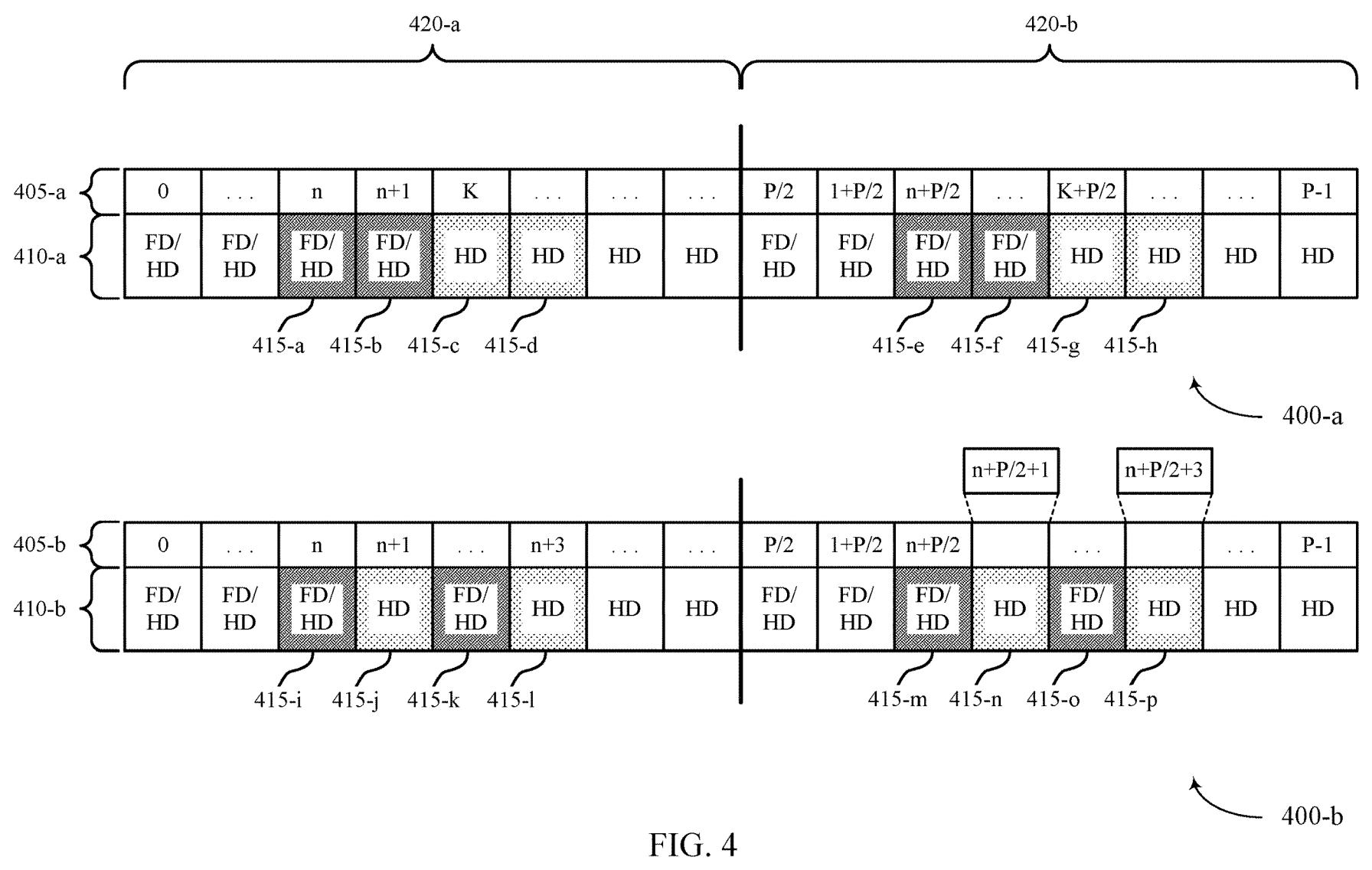

FIG. 4 shows an example of an antenna port configuration 400-*a* and an antenna port configuration 400-*b* that supports channel reporting for non-FD (e.g., HD) and FD modes in accordance with one or more aspects of the present disclosure. Specifically, FIG. 4 may illustrate techniques for multiplexing first information associated with antenna ports that are active in FD slots and second information associated with antenna ports that are inactive in FD slots (e.g., active in HD slots only) in a same CSI report. Each antenna port configuration 400 may include a row 405 (e.g., row 405-*a* and row 405-*b*) that includes indices, where each index is associated with an antenna port (e.g., a port), and a row 410 (e.g., row 410-*a* and row 410-*b*) that includes an identifier indicating the resource(s) in which the antenna port is available (e.g., FD/HD to indicate availability in FD slots and HD slots, HD to indicate availability in HD slots only).

The antenna port configuration 400-*a* and the antenna port configuration 400-*b* may include a quantity of ports, P, a starting index of selected ports, n, a port selection step, d, and a quantity of selected antenna ports per portion 420 (e.g., per polarization), L.

In cases where CSI information associated with an HD mode and an FD mode is multiplexed (e.g., combined) in a same CSI report, some methods may not include a mechanism to indicate an association between the selected antenna ports and their corresponding modes (e.g., HD or FD/HD). According to techniques described herein, a UE may use various techniques to define how port selection is reported (e.g., via a CSI report to a network entity). For instance, a UE may include one or more indications of antenna port indices, a subsampling factor, or other indications in a CSI report to identify the selected antenna ports which are active in FD communication resources.

For example, in the antenna port configuration 400-*a* may be configured with P=16, n=2, d=1 and L=4. The selected ports may include port 415-*a*, port 415-*b*, port 415-*c*, and port 415-*d* in a first portion 420-*a*, which may be repeated in a second portion 420-*b* including port 415-*e*, port 415-*f*, port 415-*g*, and port 415-*h*. Port 415-*a*, port 415-*b*, port 415-*e*, and port 415-*f* may be FD/HD active ports, while port 415-*c*, port 415-*d*, port 415-*g*, and port 415-*h* may be HD active ports (e.g., FD inactive ports). To indicate the FD/HD active ports in a CSI report, the UE may report a first index (e.g., n) indicating a starting index of the selected antenna ports and a second index (e.g., K) indicating a starting index of FD inactive ports. That is, the selected ports may start at index n and n+P/2, ports K, . . . , P/2 and $$K + \frac{P}{2}, \dots, P-1$$

are only active in HD slots, and ports n, n+1, n+P/2, and $$n + \frac{P}{2} + 1$$

are active in FD slots. Thus, a device (e.g., a UE, a network entity, or the like) may determine which of the selected antenna ports support an FD mode based on the first index and the second index.

Additionally, or alternatively, a UE may report a subsampling factor, b, to identify the FD inactive antenna ports (e.g., HD ports). For example, antenna port configuration 400-*b* may be configured with P=16, n=2, d=1 and L=4. The selected ports may include port 415-*i*, port 415-*j*, port 415-*k*, and port 415-1 in a first portion 420-*a*, which may be repeated in a second portion 420-*b* including port 415-*m*, port 415-*n*, port 415-*o*, and port 415-*p*. Port 415-*i*, port 415-*k*, port 415-*m*, and port 415-*o* may be FD/HD active ports while port 415-*j*, port 415-1, port 415-*n*, and port 415-*p* may be HD active ports (e.g., FD inactive ports). To indicate the FD/HD active ports in a CSI report, the UE may report a subsampling factor of b=2 (e.g., every other selected port is HD only). Accordingly, the selected ports may start at index n and FD inactive ports may be identified as each second index of the selected antenna ports (e.g., n+1, n+3, n+P/2+1, and n+P/2+3. Thus, a device may determine that the remaining antenna ports are FD active ports.

Figure 5:
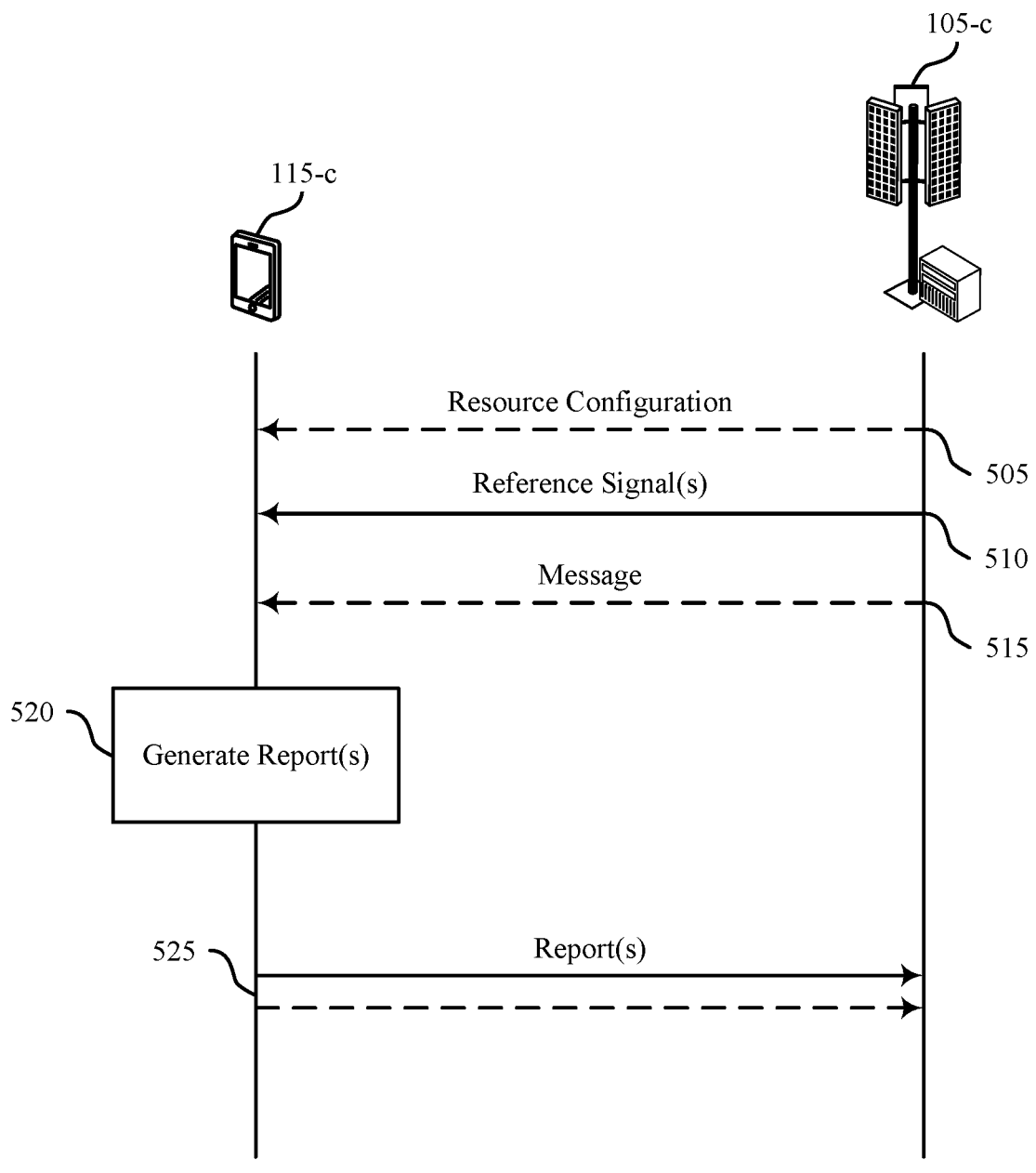
FIG. 5 shows an example of a process flow that supports channel reporting for non-FD and FD modes in accordance with one or more aspects of the present disclosure.

FIG. 5 shows an example of a process flow 500 that supports channel reporting for non-FD and FD modes in accordance with one or more aspects of the present disclosure. In some examples, process flow 500 may implement aspects of the wireless communications system 100, the wireless communications system 200, and the wireless communications system 300, and the antenna port configurations 400. For example, the process flow 500 may support channel reporting that includes information associated with HD and FD communication modes and their corresponding active antenna ports. The process flow 500 may include a UE 115-*c* and a network entity 105-*c*, which may be examples of corresponding devices herein, including with reference to FIGS. 1 through 3.

In the following description of process flow 500, the operations between the UE 115-*c* and the network entity 105-*c* may be transmitted in a different order than the order shown, or other operations may be added or removed from the process flow 500. For example, some operations may also be left out of process flow 500, or may be performed in different orders or at different times. Further, although some operations or signaling may be shown to occur at different times for discussion purposes, these operations may actually occur at the same time. Although the UE 115-*c* and the network entity 105-*c* are shown performing the operations of process flow 500, some aspects of some operations may also be performed by one or more other wireless or network devices.

At 505, the network entity 105-*c* may transmit a resource configuration (e.g., a configuration message 235) associated with CSI-RS resources and one or more CSI reports to the UE 115-*c*. In some examples, the resource configuration may include an RRC configuration including information for CSI-RS resource configurations and CSI report resources. For example, the resources configuration may include information associated with one or more antenna ports to be used for CSI-RS transmissions and for CSI measurement (e.g., computations) and reporting.

At 510, the UE 115-*c* may receive one or more (e.g., a set of) reference signals from the network entity 105-*c* in accordance with a resource configuration (e.g., at 505). In some examples, the set of reference signals may be received via non-FD communication resources (e.g., in a HD slot). The set of references signals may include one more CSI-RSs for channel estimation and measurement by the UE 115-*c*

At 515, the UE 115-*c* may receive a message (e.g., from the network entity 105-*c*) indicating a set of antenna ports that are active in the FD communication resources (e.g., FD slots). In some cases, the message at 515 may alternatively be included in the resources configuration at 505. In some examples, the UE 115-*c* may select one or more antenna ports based on the message.

At 520 (measurements and CSI metric computations including port selection) the UE 115-*c* may generate one or more CSI reports (e.g., in response to receiving the set of references signals. As part of the generating, the UE 115-*c* may perform one or more measurements of the reference signals as well as evaluate CSI metric computations associated with the reference signals and the resource configuration. Generating the one or more CSI reports may further include port selection procedures. For example, the UE 115-*c* may select a first set of antenna ports based on the resource configuration. The first set of antenna ports may include active antenna ports that are valid in the FD communication resources (e.g., FD slots) and the non-FD communication resources (e.g., HD slots). In some examples, a first threshold quantity of antenna ports of the first set of antenna ports may be based on a second threshold quantity of antenna ports associated with the FD communication resources (e.g., each of the selected antenna ports are active in FD slots).

Alternatively, the UE 115-*c* may select a subset of the first set antenna ports which include active antenna ports that are valid in the FD communication resources and the non-FD communication resources (e.g., some of the selected antenna ports may be valid in HD slots and not in FD slots). In some examples, the subset of the first set of antenna ports may be based on a rule for which antenna ports are active in the FD communication resources and the non-FD communication resources. Additionally, or alternatively, the subset of the first set of antenna ports may be based on a CSI-RS resource configuration received via an RRC message.

At 525, the UE 115-*c* may transmit, based on measuring the set of reference signals, one or more channel state information reports (e.g., to the network entity 105-*c*) in accordance with the first set of antenna ports and a second set of antenna ports. The second set of antenna ports may include active antenna ports in FD communication resources. In some examples, the one or more CSI reports may include information associated with the first set of antenna ports (e.g., the selected set of antenna ports).

In some examples, the one or more CSI reports may include a first indication of a first antenna port selection for the FD communication resources and a second indication of a second antenna port selection for the non-FD communication resources. The second antenna port selection may, in some cases, be different than the first antenna port selection. In some examples, transmitting the first indication and the second indication may be based on a first rank associated with the FD communication resources being a same rank as a second rank associated with the non-FD communication resources. Alternatively, transmitting the first indication and the second indication may be based on a first rank associated with the FD communication resources being a different rank than a second rank associated with the non-FD communication resources.

In some examples, the one or more CSI reports may include transmitting a first CSI report and a second CSI report (e.g., that are both associated with a same CSI-RS resource configuration) to the network entity 105-*c*. In some examples, a first CSI report may include first information associated with the second set of antenna ports (e.g., FD active ports) and the second CSI report may include second information associated with a third set of antenna ports (e.g., HD active antenna ports, all antenna ports, HD active ports and FD active ports).

In some examples, the first set of antenna ports may include the second set of antenna ports (e.g., FD active ports) and a third set of antenna ports that are active in the non-FD communication resources. The UE 115-*c* may transmit a CSI report including first information associated with the second set of antenna ports and second information associated with the third set of antenna ports. In some examples, the one or more CSI reports may include a first index indicating a starting index of the first set of antenna ports and a second index indicating a starting index of the third set of antenna ports. Additionally, or alternatively, the one or more CSI reports may include a subsampling factor used to identify the third set of antenna ports.

Figure 6:
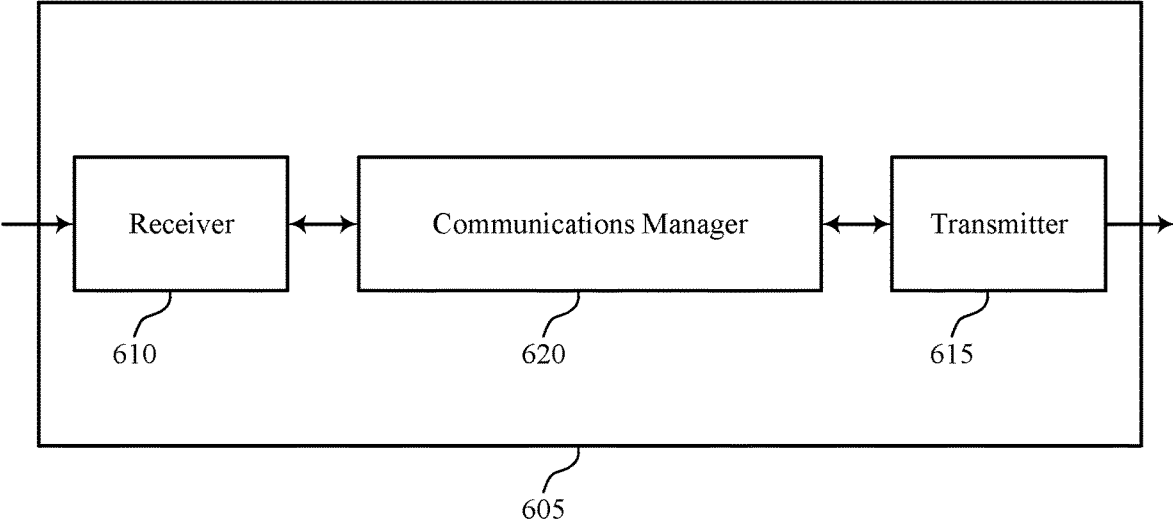
FIGS. 6 and 7 show block diagrams of devices that support channel reporting for non-FD and FD modes in accordance with one or more aspects of the present disclosure.

FIG. 6 shows a block diagram 600 of a device 605 that supports channel reporting for non-FD and FD modes in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to channel reporting for non-FD and FD modes). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to channel reporting for non-FD and FD modes). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of channel reporting for non-FD and FD modes as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 is capable of, configured to, or operable to support a means for receiving a set of reference signals from a network entity in accordance with a resource configuration, the set of reference signals being received via non-FD communication resources. The communications manager 620 is capable of, configured to, or operable to support a means for transmitting, based on measuring the set of reference signals, one or more CSI reports in accordance with a first set of antenna ports and a second set of antenna ports, the first set of antenna ports being selected by the UE based on the resource configuration, and the second set of antenna ports being active in FD communication resources, where the one or more CSI reports include information associated with the first set of antenna ports.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing, reduced power consumption, and more efficient utilization of communication resources.

Figure 7:
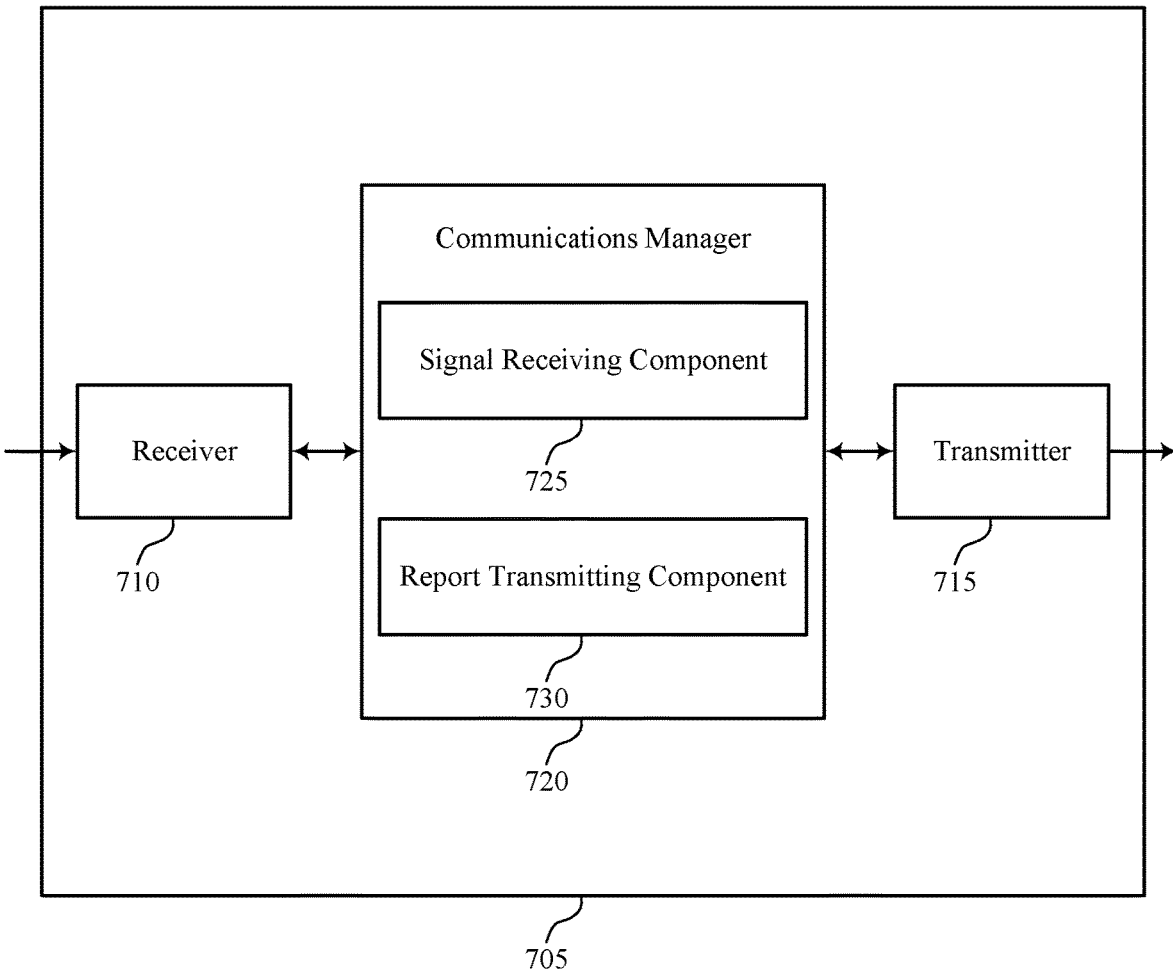
Figure 7:

FIG. 7 shows a block diagram 700 of a device 705 that supports channel reporting for non-FD and FD modes in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to channel reporting for non-FD and FD modes). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to channel reporting for non-FD and FD modes). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of channel reporting for non-FD and FD modes as described herein. For example, the communications manager 720 may include a signal receiving component 725 a report transmitting component 730, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The signal receiving component 725 is capable of, configured to, or operable to support a means for receiving a set of reference signals from a network entity in accordance with a resource configuration, the set of reference signals being received via non-FD communication resources. The report transmitting component 730 is capable of, configured to, or operable to support a means for transmitting, based on measuring the set of reference signals, one or more CSI reports in accordance with a first set of antenna ports and a second set of antenna ports, the first set of antenna ports being selected by the UE based on the resource configuration, and the second set of antenna ports being active in FD communication resources, where the one or more CSI reports include information associated with the first set of antenna ports.

Figure 8:
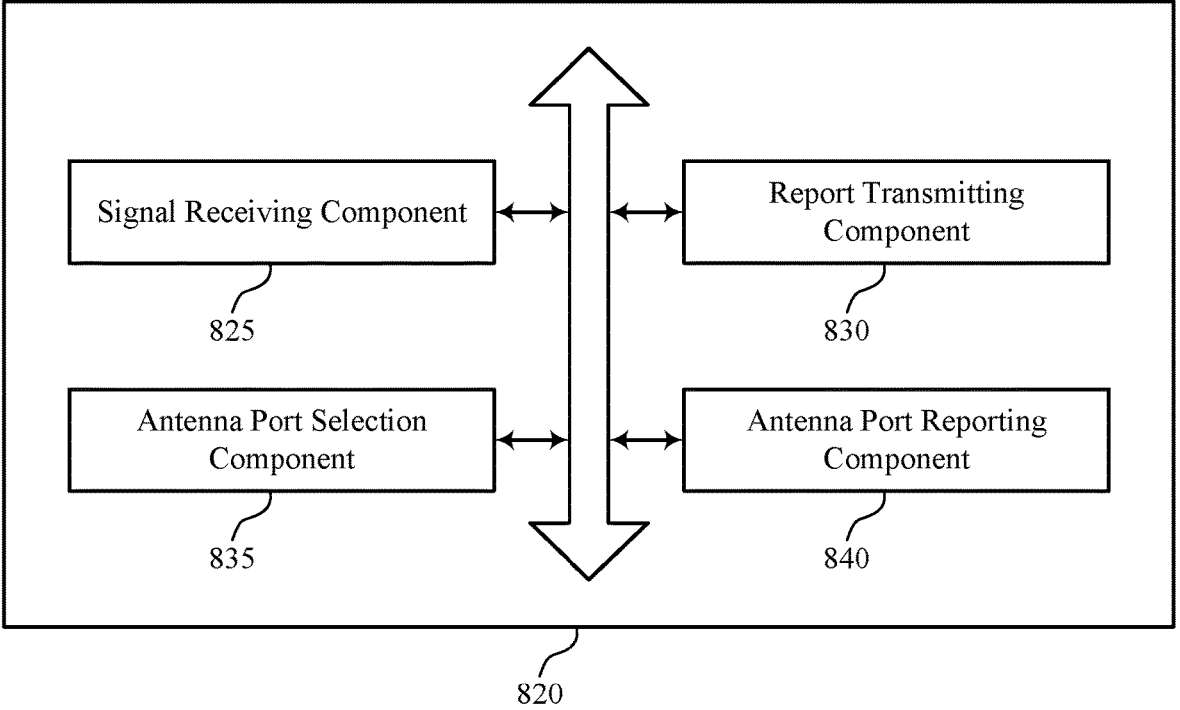
FIG. 8 shows a block diagram of a communications manager that supports channel reporting for non-FD and FD modes in accordance with one or more aspects of the present disclosure.

FIG. 8 shows a block diagram 800 of a communications manager 820 that supports channel reporting for non-FD and FD modes in accordance with one or more aspects of the present disclosure. The communications manager 820 may be an example of aspects of a communications manager 620, a communications manager 720, or both, as described herein. The communications manager 820, or various components thereof, may be an example of means for performing various aspects of channel reporting for non-FD and FD modes as described herein. For example, the communications manager 820 may include a signal receiving component 825, a report transmitting component 830, an antenna port selection component 835, an antenna port reporting component 840, or any combination thereof. Each of these components may communicate, directly or indirectly, with one another (e.g., via one or more buses).

The communications manager 820 may support wireless communications at a UE in accordance with examples as disclosed herein. The signal receiving component 825 is capable of, configured to, or operable to support a means for receiving a set of reference signals from a network entity in accordance with a resource configuration, the set of reference signals being received via non-FD communication resources. The report transmitting component 830 is capable of, configured to, or operable to support a means for transmitting, based on measuring the set of reference signals, one or more CSI reports in accordance with a first set of antenna ports and a second set of antenna ports, the first set of antenna ports being selected by the UE based on the resource configuration, and the second set of antenna ports being active in FD communication resources, where the one or more CSI reports include information associated with the first set of antenna ports.

In some examples, the first set of antenna ports selected by the UE include active antenna ports that are valid in the FD communication resources and the non-FD communication resources. In some examples, a first threshold quantity of antenna ports of the first set of antenna ports is based on a second threshold quantity of antenna ports associated with the FD communication resources. In some examples, a subset of the first set of antenna ports selected by the UE include active antenna ports that are valid in the FD communication resources and the non-FD communication resources. In some examples, the subset of the first set of antenna ports is based on a rule for which antenna ports are active in the FD communication resources and the non-FD communication resources. In some examples, the subset of the first set of antenna ports is based on a CSI reference signal resource configuration received via a radio resource control message.

In some examples, the antenna port selection component 835 is capable of, configured to, or operable to support a means for receiving a message indicating the second set of antenna ports, where the first set of antenna ports is selected by the UE based on the message. In some examples, to support transmitting the one or more CSI reports, the antenna port selection component 835 is capable of, configured to, or operable to support a means for transmitting a first indication of a first antenna port selection for the FD communication resources. In some examples, to support transmitting the one or more CSI reports, the antenna port selection component 835 is capable of, configured to, or operable to support a means for transmitting a second indication of a second antenna port selection for the non-FD communication resources, the second antenna port selection being different than the first antenna port selection.

In some examples, transmitting the first indication and the second indication is based on a first rank associated with the FD communication resources being a same rank as a second rank associated with the non-FD communication resources. In some examples, transmitting the first indication and the second indication is based on a first rank associated with the FD communication resources being a different rank than a second rank associated with the non-FD communication resources.

In some examples, to support transmitting the one or more CSI reports, the antenna port reporting component 840 is capable of, configured to, or operable to support a means for transmitting a first CSI report that includes first information associated with the second set of antenna ports. In some examples, to support transmitting the one or more CSI reports, the antenna port reporting component 840 is capable of, configured to, or operable to support a means for transmitting a second CSI report that includes second information associated with a third set of antenna ports.

In some examples, to support transmitting the one or more CSI reports, the antenna port reporting component 840 is capable of, configured to, or operable to support a means for transmitting a CSI report including first information associated with the second set of antenna ports and second information associated with the third set of antenna ports. In some examples, the one or more CSI reports include a first index indicating a starting index of the first set of antenna ports and a second index indicating a starting index of the third set of antenna ports. In some examples, the one or more CSI reports include a subsampling factor used to identify the third set of antenna ports.

Figure 9:
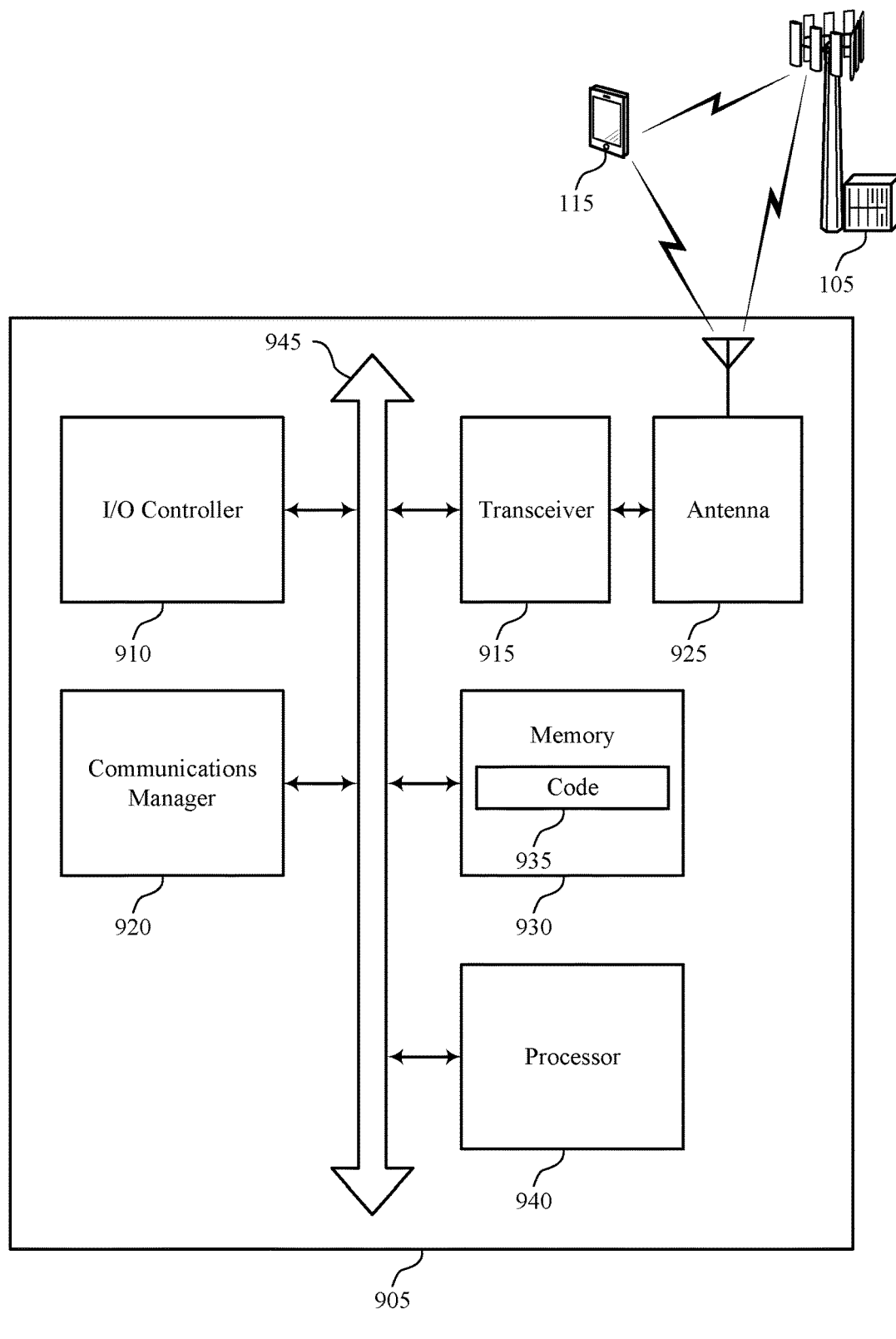
FIG. 9 shows a diagram of a system including a device that supports channel reporting for non-FD and FD modes in accordance with one or more aspects of the present disclosure.

FIG. 9 shows a diagram of a system 900 including a device 905 that supports channel reporting for non-FD and FD modes in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting channel reporting for non-FD and FD modes). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 is capable of, configured to, or operable to support a means for receiving a set of reference signals from a network entity in accordance with a resource configuration, the set of reference signals being received via non-FD communication resources. The communications manager 920 is capable of, configured to, or operable to support a means for transmitting, based on measuring the set of reference signals, one or more CSI reports in accordance with a first set of antenna ports and a second set of antenna ports, the first set of antenna ports being selected by the UE based on the resource configuration, and the second set of antenna ports being active in FD communication resources, where the one or more CSI reports include information associated with the first set of antenna ports.

By including or configuring the communications manager 920 in accordance with examples as described herein, the device 905 may support techniques for reduced latency, improved user experience related to reduced processing, reduced power consumption, more efficient utilization of communication resources, longer battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of channel reporting for non-FD and FD modes as described herein, or the processor 940 and the memory 930 may be otherwise configured to perform or support such operations.

Figure 10:
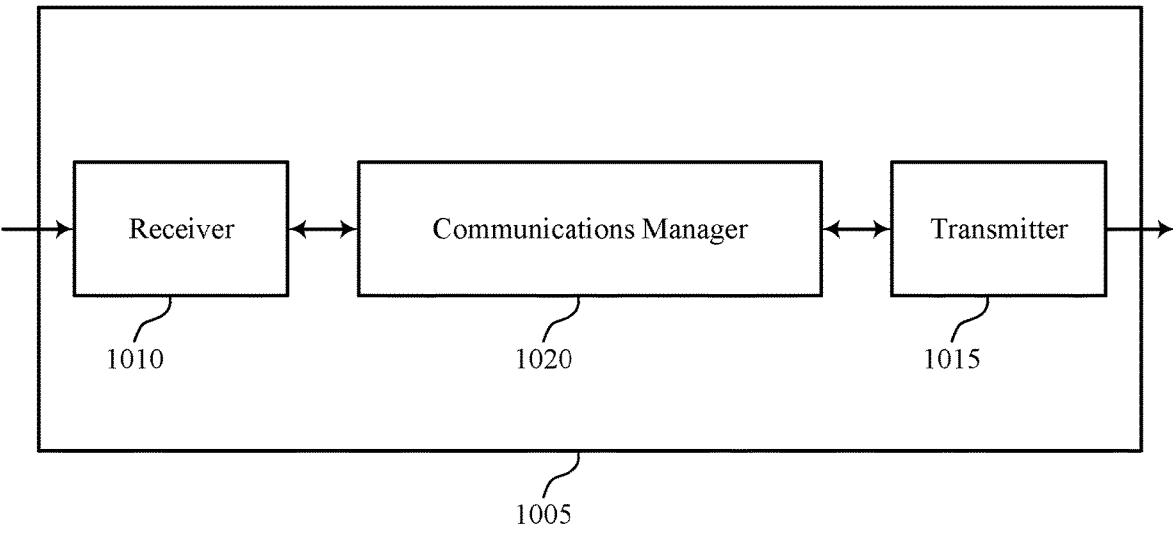
FIGS. 10 and 11 show block diagrams of devices that support channel reporting for non-FD and FD modes in accordance with one or more aspects of the present disclosure.

FIG. 10 shows a block diagram 1000 of a device 1005 that supports channel reporting for non-FD and FD modes in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of channel reporting for non-FD and FD modes as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. For example, the communications manager 1020 is capable of, configured to, or operable to support a means for transmitting a set of reference signals to a UE in accordance with a resource configuration, the set of reference signals being transmitted via non-FD communication resources. The communications manager 1020 is capable of, configured to, or operable to support a means for receiving, in response to transmitting the set of reference signals, one or more CSI reports in accordance with a first set of antenna ports and a second set of antenna ports, the first set of antenna ports being based on the resource configuration, and the second set of antenna ports being active in FD communication resources, where the one or more CSI reports include information associated with the first set of antenna ports.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced processing, reduced power consumption, and more efficient utilization of communication resources.

Figure 11:
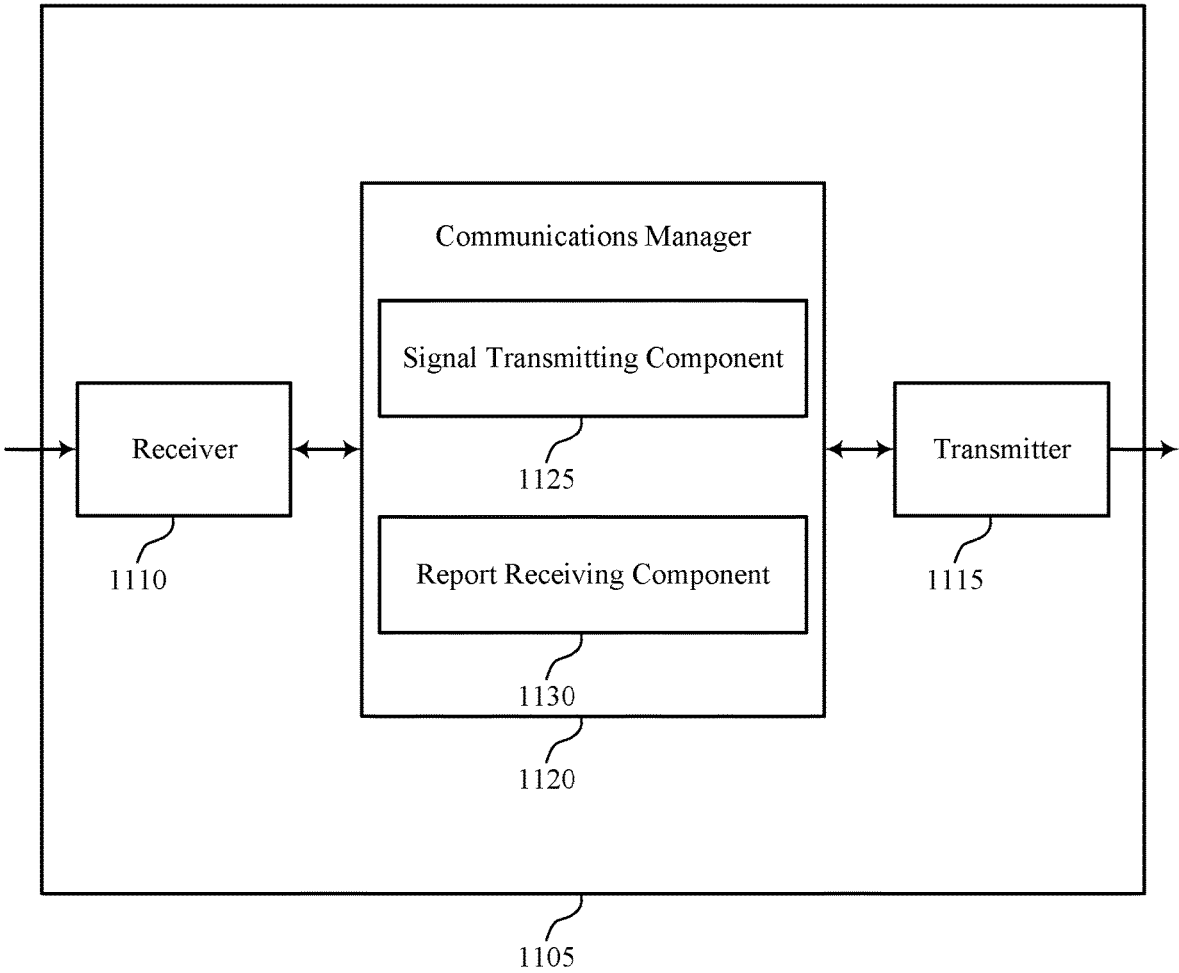

FIG. 11 shows a block diagram 1100 of a device 1105 that supports channel reporting for non-FD and FD modes in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of channel reporting for non-FD and FD modes as described herein. For example, the communications manager 1120 may include a signal transmitting component 1125 a report receiving component 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. The signal transmitting component 1125 is capable of, configured to, or operable to support a means for transmitting a set of reference signals to a UE in accordance with a resource configuration, the set of reference signals being transmitted via non-FD communication resources. The report receiving component 1130 is capable of, configured to, or operable to support a means for receiving, in response to transmitting the set of reference signals, one or more CSI reports in accordance with a first set of antenna ports and a second set of antenna ports, the first set of antenna ports being based on the resource configuration, and the second set of antenna ports being active in FD communication resources, where the one or more CSI reports include information associated with the first set of antenna ports.

Figure 12:
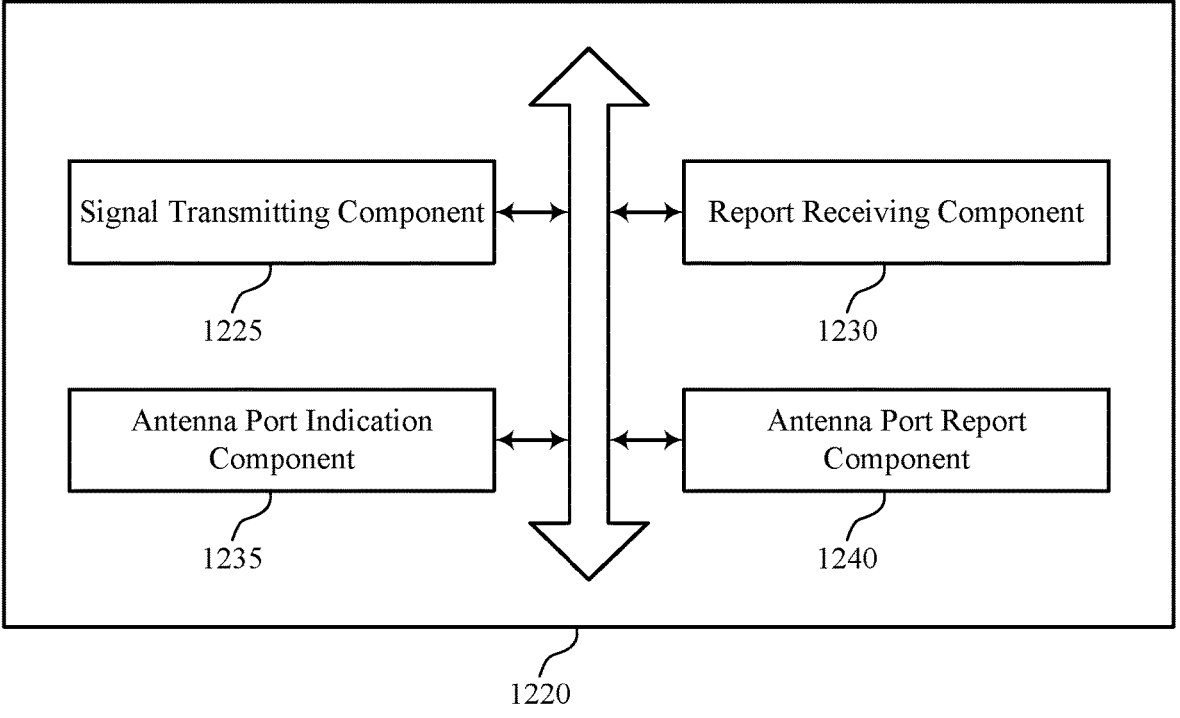
FIG. 12 shows a block diagram of a communications manager that supports channel reporting for non-FD and FD modes in accordance with one or more aspects of the present disclosure.

FIG. 12 shows a block diagram 1200 of a communications manager 1220 that supports channel reporting for non-FD and FD modes in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of channel reporting for non-FD and FD modes as described herein. For example, the communications manager 1220 may include a signal transmitting component 1225, a report receiving component 1230, an antenna port indication component 1235, an antenna port report component 1240, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples as disclosed herein. The signal transmitting component 1225 is capable of, configured to, or operable to support a means for transmitting a set of reference signals to a UE in accordance with a resource configuration, the set of reference signals being transmitted via non-FD communication resources. The report receiving component 1230 is capable of, configured to, or operable to support a means for receiving, in response to transmitting the set of reference signals, one or more CSI reports in accordance with a first set of antenna ports and a second set of antenna ports, the first set of antenna ports being based on the resource configuration, and the second set of antenna ports being active in FD communication resources, where the one or more CSI reports include information associated with the first set of antenna ports.

In some examples, the first set of antenna ports include active antenna ports that are valid in the FD communication resources and the non-FD communication resources. In some examples, a first threshold quantity of antenna ports of the first set of antenna ports is based on a second threshold quantity of antenna ports associated with the FD communication resources. In some examples, a subset of the first set of antenna ports selected by the UE include active antenna ports that are valid in the FD communication resources and the non-FD communication resources. In some examples, the subset of the first set of antenna ports is based on a rule for which antenna ports are active in the FD communication resources and the non-FD communication resources. In some examples, the subset of the first set of antenna ports is based on a CSI reference signal resource configuration transmitted via a radio resource control message.

In some examples, the antenna port indication component 1235 is capable of, configured to, or operable to support a means for transmitting a message indicating the second set of antenna ports, where the first set of antenna ports is based on the message. In some examples, to support receiving the one or more CSI reports, the antenna port indication component 1235 is capable of, configured to, or operable to support a means for receiving a first indication of a first port selection for the FD communication resources. In some examples, to support receiving the one or more CSI reports, the antenna port indication component 1235 is capable of, configured to, or operable to support a means for receiving a second indication of a second port selection for the non-FD communication resources.

In some examples, receiving the first indication and the second indication is based on a first rank associated with the FD communication resources being as same rank as a second rank associated with the non-FD communication resources. In some examples, receiving the first indication and the second indication is based on a first rank associated with the FD communication resources being different than a second rank associated with the non-FD communication resources.

In some examples, to support receiving the one or more CSI reports, the antenna port report component 1240 is capable of, configured to, or operable to support a means for receiving a first CSI report that includes first information associated with the second set of antenna ports. In some examples, to support receiving the one or more CSI reports, the antenna port report component 1240 is capable of, configured to, or operable to support a means for receiving a second CSI report that includes second information associated with a third set of antenna ports.

In some examples, to support receiving the one or more CSI reports, the antenna port report component 1240 is capable of, configured to, or operable to support a means for receiving a CSI report including first information associated with the second set of antenna ports and second information associated with the third set of antenna ports. In some examples, the one or more CSI reports include a first index indicating a starting index of the first set of antenna ports and a second index indicating a starting index of the third set of antenna ports. In some examples, the one or more CSI reports include a subsampling factor used to identify the third set of antenna ports.

Figure 13:
FIG. 13 shows a diagram of a system including a device that supports channel reporting for non-FD and FD modes in accordance with one or more aspects of the present disclosure.

FIG. 13 shows a diagram of a system 1300 including a device 1305 that supports channel reporting for non-FD and FD modes in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting channel reporting for non-FD and FD modes). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network entity in accordance with examples as disclosed herein. For example, the communications manager 1320 is capable of, configured to, or operable to support a means for transmitting a set of reference signals to a UE in accordance with a resource configuration, the set of reference signals being transmitted via non-FD communication resources. The communications manager 1320 is capable of, configured to, or operable to support a means for receiving, in response to transmitting the set of reference signals, one or more CSI reports in accordance with a first set of antenna ports and a second set of antenna ports, the first set of antenna ports being based on the resource configuration, and the second set of antenna ports being active in FD communication resources, where the one or more CSI reports include information associated with the first set of antenna ports.

By including or configuring the communications manager 1320 in accordance with examples as described herein, the device 1305 may support techniques for reduced latency, improved user experience related to reduced processing, reduced power consumption, more efficient utilization of communication resources, longer battery life, and improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of channel reporting for non-FD and FD modes as described herein, or the processor 1335 and the memory 1325 may be otherwise configured to perform or support such operations.

FIG. 14 shows a flowchart illustrating a method 1400 that supports channel reporting for non-FD and FD modes in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a set of reference signals from a network entity in accordance with a resource configuration, the set of reference signals being received via non-FD communication resources. The operations of 1405 may be performed in accordance with examples as disclosed herein. In some examples, aspects of the operations of 1405 may be performed by a signal receiving component 825 as described with reference to FIG. 8.

At 1410, the method may include transmitting, based on measuring the set of reference signals, one or more CSI reports in accordance with a first set of antenna ports and a second set of antenna ports, the first set of antenna ports being selected by the UE based on the resource configuration, and the second set of antenna ports being active in FD communication resources, where the one or more CSI reports include information associated with the first set of antenna ports. The operations of 1410 may be performed in accordance with examples as disclosed herein. In some examples, aspects of the operations of 1410 may be performed by a report transmitting component 830 as described with reference to FIG. 8.

FIG. 15 shows a flowchart illustrating a method 1500 that supports channel reporting for non-FD and FD modes in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving a set of reference signals from a network entity in accordance with a resource configuration, the set of reference signals being received via non-FD communication resources. The operations of 1505 may be performed in accordance with examples as disclosed herein. In some examples, aspects of the operations of 1505 may be performed by a signal receiving component 825 as described with reference to FIG. 8.

At 1510, the method may include transmitting, based on measuring the set of reference signals, a CSI report in accordance with a first set of antenna ports and a second set of antenna ports, the first set of antenna ports being selected by the UE based on the resource configuration, and the second set of antenna ports being active in FD communication resources, where the first set of antenna ports includes the second set of antenna ports and a third set of antenna ports that are active in the non-FD (e.g., HD) communication resources. In some examples, the CSI report includes information associated with the first set of antenna ports and further includes first information associated with the second set of antenna ports and second information associated with the third set of antenna ports. The operations of 1510 may be performed in accordance with examples as disclosed herein. In some examples, aspects of the operations of 1510 may be performed by an antenna port reporting component 840 as described with reference to FIG. 8.

FIG. 16 shows a flowchart illustrating a method 1600 that supports channel reporting for non-FD and FD modes in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving a set of reference signals from a network entity in accordance with a resource configuration, the set of reference signals being received via non-FD communication resources. The operations of 1605 may be performed in accordance with examples as disclosed herein. In some examples, aspects of the operations of 1605 may be performed by a signal receiving component 825 as described with reference to FIG. 8.

At 1610, the method may include transmitting, based on measuring the set of reference signals, a first CSI report in accordance with a first set of antenna ports and a second set of antenna ports, the first set of antenna ports being selected by the UE based on the resource configuration, and the second set of antenna ports being active in FD communication resources. In some aspects, the first CSI report includes information associated with the first set of antenna ports and further includes first information associated with the second set of antenna ports. The operations of 1610 may be performed in accordance with examples as disclosed herein. In some examples, aspects of the operations of 1610 may be performed by an antenna port reporting component 840 as described with reference to FIG. 8.

At 1615, the method may include transmitting, based on measuring the set of reference signals, a second CSI report that includes information associated with the first set of antenna ports and further includes second information associated with a third set of antenna ports that are active in the non-FD communication resources. The operations of 1615 may be performed in accordance with examples as disclosed herein. In some examples, aspects of the operations of 1615 may be performed by an antenna port reporting component 840 as described with reference to FIG. 8.

FIG. 17 shows a flowchart illustrating a method 1700 that supports channel reporting for non-FD and FD modes in accordance with aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting a set of reference signals to a UE in accordance with a resource configuration, the set of reference signals being transmitted via non-FD communication resources. The operations of 1705 may be performed in accordance with examples as disclosed herein. In some examples, aspects of the operations of 1705 may be performed by a signal transmitting component 1225 as described with reference to FIG. 12.

At 1710, the method may include receiving, in response to transmitting the set of reference signals, one or more CSI reports in accordance with a first set of antenna ports and a second set of antenna ports, the first set of antenna ports being based on the resource configuration, and the second set of antenna ports being active in FD communication resources, where the one or more CSI reports include information associated with the first set of antenna ports. The operations of 1710 may be performed in accordance with examples as disclosed herein. In some examples, aspects of the operations of 1710 may be performed by a report receiving component 1230 as described with reference to FIG. 12.

FIG. 18 shows a flowchart illustrating a method 1800 that supports channel reporting for non-FD and FD modes in accordance with aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include transmitting a set of reference signals to a UE in accordance with a resource configuration, the set of reference signals being transmitted via non-FD communication resources. The operations of 1805 may be performed in accordance with examples as disclosed herein. In some examples, aspects of the operations of 1805 may be performed by a signal transmitting component 1225 as described with reference to FIG. 12.

At 1810, the method may include receiving, in response to transmitting the set of reference signals, a CSI report in accordance with a first set of antenna ports and a second set of antenna ports, the first set of antenna ports being based on the resource configuration, and the second set of antenna ports being active in FD communication resources, where the first set of antenna ports includes the second set of antenna ports and a third set of antenna ports that are active in the non-FD (e.g., HD) communication resources. In some examples, the CSI report includes information associated with the first set of antenna ports and further includes first information associated with the second set of antenna ports and second information associated with the third set of antenna ports. The operations of 1810 may be performed in accordance with examples as disclosed herein. In some examples, aspects of the operations of 1810 may be performed by an antenna port report component 1240 as described with reference to FIG. 12.

FIG. 19 shows a flowchart illustrating a method 1900 that supports channel reporting for non-FD and FD modes in accordance with aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1905, the method may include transmitting a set of reference signals to a UE in accordance with a resource configuration, the set of reference signals being transmitted via non-FD communication resources. The operations of 1905 may be performed in accordance with examples as disclosed herein. In some examples, aspects of the operations of 1905 may be performed by a signal transmitting component 1225 as described with reference to FIG. 12.

At 1910, the method may include receiving, in response to transmitting the set of reference signals, a first CSI report in accordance with a first set of antenna ports and a second set of antenna ports, the first set of antenna ports being based on the resource configuration, and the second set of antenna ports being active in FD communication resources. In some cases, the first CSI reports includes information associated with the first set of antenna ports and further includes first information associated with the second set of antenna ports. The operations of 1910 may be performed in accordance with examples as disclosed herein. In some examples, aspects of the operations of 1910 may be performed by an antenna port report component 1240 as described with reference to FIG. 12.

At 1915, the method may include receiving, in response to transmitting the set of reference signals, a second CSI report that includes information associated with the first set of antenna ports and further includes second information associated with a third set of antenna ports that are active in the non-FD (e.g., HD) communication resources. The operations of 1915 may be performed in accordance with examples as disclosed herein. In some examples, aspects of the operations of 1915 may be performed by an antenna port report component 1240 as described with reference to FIG. 12.

The following provides an overview of aspects of the present disclosure:

Aspect 1: A method for wireless communications at a UE, comprising: receiving a set of reference signals from a network entity in accordance with a resource configuration, the set of reference signals being received via non-full-duplex communication resources; and transmitting, based at least in part on measuring the set of reference signals, one or more channel state information reports in accordance with a first set of antenna ports and a second set of antenna ports, the first set of antenna ports being selected by the UE based at least in part on the resource configuration, and the second set of antenna ports being active in full-duplex communication resources, wherein the one or more channel state information reports include information associated with the first set of antenna ports.

Aspect 2: The method of aspect 1, wherein the first set of antenna ports selected by the UE comprise active antenna ports that are valid in the full-duplex communication resources and the non-full-duplex communication resources.

Aspect 3: The method of aspect 2, wherein a first threshold quantity of antenna ports of the first set of antenna ports is based at least in part on a second threshold quantity of antenna ports associated with the full-duplex communication resources.

Aspect 4: The method of aspect 1, wherein a subset of the first set of antenna ports selected by the UE comprise active antenna ports that are valid in the full-duplex communication resources and the non-full-duplex communication resources.

Aspect 5: The method of aspect 4, wherein the subset of the first set of antenna ports is based at least in part on a rule for which antenna ports are active in the full-duplex communication resources and the non-full-duplex communication resources.

Aspect 6: The method of aspect 4, wherein the subset of the first set of antenna ports is based at least in part on a channel state information reference signal resource configuration received via a radio resource control message.

Aspect 7: The method of any of aspects 1 through 6, further comprising: receiving a message indicating the second set of antenna ports, wherein the first set of antenna ports is selected by the UE based at least in part on the message.

Aspect 8: The method of aspect 7, wherein transmitting the one or more channel state information reports comprises: transmitting a first indication of a first antenna port selection for the full-duplex communication resources; and transmitting a second indication of a second antenna port selection for the non-full-duplex communication resources, the second antenna port selection being different than the first antenna port selection.

Aspect 9: The method of aspect 8, wherein transmitting the first indication and the second indication is based at least in part on a first rank associated with the full-duplex communication resources being a same rank as a second rank associated with the non-full-duplex communication resources.

Aspect 10: The method of aspect 8, wherein transmitting the first indication and the second indication is based at least in part on a first rank associated with the full-duplex communication resources being a different rank than a second rank associated with the non-full-duplex communication resources.

Aspect 11: The method of any of aspects 1 through 10, wherein transmitting the one or more channel state information reports comprises: transmitting a first channel state information report that includes first information associated with the second set of antenna ports; and transmitting a second channel state information report that includes second information associated with a third set of antenna ports that are active in the non-full-duplex communication resources.

Aspect 12: The method of any of aspects 1 through 10, wherein the first set of antenna ports comprises the second set of antenna ports and a third set of antenna ports that are active in the non-full-duplex communication resources, and wherein transmitting the one or more channel state information reports further comprises: transmitting a channel state information report comprising first information associated with the second set of antenna ports and second information associated with the third set of antenna ports.

Aspect 13: The method of aspect 12, wherein the one or more channel state information reports comprise a first index indicating a starting index of the first set of antenna ports and a second index indicating a starting index of the third set of antenna ports.

Aspect 14: The method of any of aspects 12 through 13, wherein the one or more channel state information reports comprise a subsampling factor used to identify the third set of antenna ports.

Aspect 15: A method for wireless communications at a network entity, comprising: transmitting a set of reference signals to a UE in accordance with a resource configuration, the set of reference signals being transmitted via non-fullduplex communication resources; and receiving, in response to transmitting the set of reference signals, one or more channel state information reports in accordance with a first set of antenna ports and a second set of antenna ports, the first set of antenna ports being based at least in part on the resource configuration, and the second set of antenna ports being active in full-duplex communication resources, wherein the one or more channel state information reports include information associated with the first set of antenna ports.

Aspect 16: The method of aspect 15, wherein the first set of antenna ports comprise active antenna ports that are valid in the full-duplex communication resources and the non-full-duplex communication resources.

Aspect 17: The method of aspect 16, wherein a first threshold quantity of antenna ports of the first set of antenna ports is based at least in part on a second threshold quantity of antenna ports associated with the full-duplex communication resources.

Aspect 18: The method of aspect 15, wherein a subset of the first set of antenna ports selected by the UE comprise active antenna ports that are valid in the full-duplex communication resources and the non-full-duplex communication resources.

Aspect 19: The method of aspect 18, wherein the subset of the first set of antenna ports is based at least in part on a rule for which antenna ports are active in the full-duplex communication resources and the non-full-duplex communication resources.

Aspect 20: The method of aspect 18, wherein the subset of the first set of antenna ports is based at least in part on a channel state information reference signal resource configuration transmitted via a radio resource control message.

Aspect 21: The method of any of aspects 15 through 20, further comprising: transmitting a message indicating the second set of antenna ports, wherein the first set of antenna ports is based at least in part on the message.

Aspect 22: The method of aspect 21, wherein receiving the one or more channel state information reports comprises: receiving a first indication of a first port selection for the full-duplex communication resources; and receiving a second indication of a second port selection for the non-full-duplex communication resources.

Aspect 23: The method of aspect 22, wherein receiving the first indication and the second indication is based at least in part on a first rank associated with the full-duplex communication resources being as same rank as a second rank associated with the non-full-duplex communication resources.

Aspect 24: The method of aspect 22, wherein receiving the first indication and the second indication is based at least in part on a first rank associated with the full-duplex communication resources being different than a second rank associated with the non-full-duplex communication resources.

Aspect 25: The method of any of aspects 15 through 24, wherein receiving the one or more channel state information reports comprises: receiving a first channel state information report that includes first information associated with the second set of antenna ports; and receiving a second channel state information report that includes second information associated with a third set of antenna ports that are active in the non-full-duplex communication resources.

Aspect 26: The method of any of aspects 15 through 24, wherein the first set of antenna ports comprises the second set of antenna ports and a third set of antenna ports that are active in the non-full-duplex communication resources, and wherein receiving the one or more channel state information reports further comprises: receiving a channel state information report including first information associated with the second set of antenna ports and second information associated with the third set of antenna ports.

Aspect 27: The method of aspect 26, wherein the one or more channel state information reports comprise a first index indicating a starting index of the first set of antenna ports and a second index indicating a starting index of the third set of antenna ports.

Aspect 28: The method of any of aspects 26 through 27, wherein the one or more channel state information reports comprise a subsampling factor used to identify the third set of antenna ports.

Aspect 29: An apparatus for wireless communications at a UE, comprising a processor; memory coupled with the processor; and instructions stored in the memory and executable by the processor to cause the apparatus to perform a method of any of aspects 1 through 14.

Aspect 30: An apparatus for wireless communications at a UE, comprising at least one means for performing a method of any of aspects 1 through 14.

Aspect 31: A non-transitory computer-readable medium storing code for wireless communications at a UE, the code comprising instructions executable by a processor to perform a method of any of aspects 1 through 14.

Aspect 32: An apparatus for wireless communications at a network entity, comprising a processor; memory coupled with the processor; and instructions stored in the memory and executable by the processor to cause the apparatus to perform a method of any of aspects 15 through 28.

Aspect 33: An apparatus for wireless communications at a network entity, comprising at least one means for performing a method of any of aspects 15 through 28.

Aspect 34: A non-transitory computer-readable medium storing code for wireless communications at a network entity, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
a memory; and
a processor coupled with the memory and configured to:
receive a set of reference signals from a network entity in accordance with a resource configuration, the set of reference signals being received via non-full-duplex communication resources; and
transmit, based at least in part on measuring the set of reference signals, one or more channel state information reports in accordance with a first set of antenna ports and a second set of antenna ports, the first set of antenna ports being selected by the UE based at least in part on the resource configuration, and the second set of antenna ports being active in full-duplex communication resources, wherein the one or more channel state information reports include information associated with the first set of antenna ports.

2. The apparatus of claim 1, wherein the first set of antenna ports selected by the UE comprise active antenna ports that are valid in the full-duplex communication resources and the non-full-duplex communication resources.

3. The apparatus of claim 2, wherein a first threshold quantity of antenna ports of the first set of antenna ports is based at least in part on a second threshold quantity of antenna ports associated with the full-duplex communication resources.

4. The apparatus of claim 1, wherein a subset of the first set of antenna ports selected by the UE comprise active antenna ports that are valid in the full-duplex communication resources and the non-full-duplex communication resources.

5. The apparatus of claim 4, wherein the subset of the first set of antenna ports is based at least in part on a rule for which antenna ports are active in the full-duplex communication resources and the non-full-duplex communication resources.

6. The apparatus of claim 4, wherein the subset of the first set of antenna ports is based at least in part on a channel state information reference signal resource configuration received via a radio resource control message.

7. The apparatus of claim 1, wherein the processor is further configured to:
receive a message indicating the second set of antenna ports, wherein the first set of antenna ports is selected by the UE based at least in part on the message.

8. The apparatus of claim 7, wherein, to transmit the one or more channel state information reports, the processor is configured to:
transmit a first indication of a first antenna port selection for the full-duplex communication resources; and
transmit a second indication of a second antenna port selection for the non-full-duplex communication resources, the second antenna port selection being different than the first antenna port selection.

9. The apparatus of claim 8, wherein transmitting the first indication and the second indication is based at least in part on a first rank associated with the full-duplex communication resources being a same rank as a second rank associated with the non-full-duplex communication resources.

10. The apparatus of claim 8, wherein transmitting the first indication and the second indication is based at least in part on a first rank associated with the full-duplex communication resources being a different rank than a second rank associated with the non-full-duplex communication resources.

11. The apparatus of claim 1, wherein, to transmit the one or more channel state information reports, the processor is configured to:

transmit a first channel state information report that includes first information associated with the second set of antenna ports; and transmit a second channel state information report that includes second information associated with a third set of antenna ports that are active in the non-full-duplex communication resources.

12. The apparatus of claim 1, wherein the first set of antenna ports comprises the second set of antenna ports and a third set of antenna ports that are active in the non-full-duplex communication resources, and wherein, to transmit the one or more channel state information reports, the processor is configured to:

transmit a channel state information report including first information associated with the second set of antenna ports and second information associated with the third set of antenna ports.

13. The apparatus of claim 12, wherein the one or more channel state information reports comprise a first index indicating a starting index of the first set of antenna ports and a second index indicating a starting index of the third set of antenna ports.

14. The apparatus of claim 12, wherein the one or more channel state information reports comprise a subsampling factor used to identify the third set of antenna ports.

15. An apparatus for wireless communications at a network entity, comprising:

a memory; and a processor coupled with the memory and configured to:

transmit a set of reference signals to a user equipment (UE) in accordance with a resource configuration, the set of reference signals being transmitted via non-full-duplex communication resources; and receive, in response to transmitting the set of reference signals, one or more channel state information reports in accordance with a first set of antenna ports and a second set of antenna ports, the first set of antenna ports being based at least in part on the resource configuration, and the second set of antenna ports being active in full-duplex communication resources, wherein the one or more channel state information reports include information associated with the first set of antenna ports.

16. The apparatus of claim 15, wherein the first set of antenna ports comprise active antenna ports that are valid in the full-duplex communication resources and the non-full-duplex communication resources.

17. The apparatus of claim 16, wherein a first threshold quantity of antenna ports of the first set of antenna ports is based at least in part on a second threshold quantity of antenna ports associated with the full-duplex communication resources.

18. The apparatus of claim 15, wherein a subset of the first set of antenna ports selected by the UE comprise active antenna ports that are valid in the full-duplex communication resources and the non-full-duplex communication resources.

19. The apparatus of claim 18, wherein the subset of the first set of antenna ports is based at least in part on a rule for which antenna ports are active in the full-duplex communication resources and the non-full-duplex communication resources.

20. The apparatus of claim 18, wherein the subset of the first set of antenna ports is based at least in part on a channel state information reference signal resource configuration transmitted via a radio resource control message.

21. The apparatus of claim 15, wherein the processor is further configured to:

transmit a message indicating the second set of antenna ports, wherein the first set of antenna ports is based at least in part on the message.

22. The apparatus of claim 21, wherein, to receive the one or more channel state information reports, the processor is configured to:

receive a first indication of a first port selection for the full-duplex communication resources; and receive a second indication of a second port selection for the non-full-duplex communication resources.

23. The apparatus of claim 22, wherein receiving the first indication and the second indication is based at least in part on a first rank associated with the full-duplex communication resources being as same rank as a second rank associated with the non-full-duplex communication resources.

24. The apparatus of claim 22, wherein receiving the first indication and the second indication is based at least in part on a first rank associated with the full-duplex communication resources being different than a second rank associated with the non-full-duplex communication resources.

25. The apparatus of claim 15, wherein, to receive the one or more channel state information reports, the processor is configured to:

receive a first channel state information report that includes first information associated with the second set of antenna ports; and receive a second channel state information report that includes second information associated with a third set of antenna ports that are active in the non-full-duplex communication resources.

26. The apparatus of claim 15, wherein the first set of antenna ports comprises the second set of antenna ports and a third set of antenna ports that are active in the non-full-duplex communication resources, and wherein, to receive the one or more channel state information reports, the processor is configured to:

receive a channel state information report including first information associated with the second set of antenna ports and second information associated with the third set of antenna ports.

27. The apparatus of claim 26, wherein the one or more channel state information reports comprise a first index indicating a starting index of the first set of antenna ports and a second index indicating a starting index of the third set of antenna ports.

28. The apparatus of claim 26, wherein the one or more channel state information reports comprise a subsampling factor used to identify the third set of antenna ports.

29. A method for wireless communications at a user equipment (UE), comprising:

receiving a set of reference signals from a network entity in accordance with a resource configuration, the set of reference signals being received via non-full-duplex communication resources; and transmitting, based at least in part on measuring the set of reference signals, one or more channel state information reports in accordance with a first set of antenna ports and a second set of antenna ports, the first set of antenna ports being selected by the UE based at least in part on the resource configuration, and the second set of antenna ports being active in full-duplex communication resources, wherein the one or more channel state information reports include information associated with the first set of antenna ports.

30. A method for wireless communications at a network entity, comprising:

transmitting a set of reference signals to a user equipment (UE) in accordance with a resource configuration, the set of reference signals being transmitted via non-full-duplex communication resources; and receiving, in response to transmitting the set of reference signals, one or more channel state information reports in accordance with a first set of antenna ports and a second set of antenna ports, the first set of antenna ports being based at least in part on the resource configuration, and the second set of antenna ports being active in full-duplex communication resources, wherein the one or more channel state information reports include information associated with the first set of antenna ports.

*    *    *    *    *